United States Patent [19]
Haley

[11] Patent Number: 5,826,403
[45] Date of Patent: Oct. 27, 1998

[54] HORIZONTAL FORM, FILL, AND SEAL PACKAGING MACHINE

[75] Inventor: Charles T. Haley, Bogart, Ga.

[73] Assignee: Food Machinery Sales, Inc., Athens, Ga.

[21] Appl. No.: 867,935

[22] Filed: Jun. 3, 1997

Related U.S. Application Data

[62] Division of Ser. No. 545,346, Oct. 17, 1995, Pat. No. 5,678,390.

[51] Int. Cl.$^6$ .............................. B65B 9/06; B65B 41/12; B65B 41/16
[52] U.S. Cl. ............................ 53/450; 53/550; 53/389.4; 242/559; 242/559.4
[58] Field of Search ......................... 53/450, 550, 389.4, 53/389.2, 447, 551, 552, 374.4; 226/190; 242/559, 559.1, 559.4, 560

[56] References Cited

U.S. PATENT DOCUMENTS

| | | | |
|---|---|---|---|
| 2,625,779 | 1/1953 | Peterson | 53/389.4 |
| 3,218,961 | 11/1965 | Kraft et al. | 100/93 |
| 3,703,841 | 11/1972 | Crawford | 83/341 |
| 3,850,780 | 11/1974 | Crawford et al. | 156/583 |
| 3,943,686 | 3/1976 | Crawford et al. | |
| 4,035,984 | 7/1977 | Gerlach et al. | |
| 4,102,111 | 7/1978 | Nack et al. | |
| 4,106,262 | 8/1978 | Aterianus | |
| 4,106,265 | 8/1978 | Aterianus | |
| 4,185,442 | 1/1980 | Johnson | 53/389.4 X |
| 4,604,848 | 8/1986 | Clostermeyer | 53/389.4 X |
| 4,637,199 | 1/1987 | Steck et al. | 53/451 |
| 4,695,007 | 9/1987 | Muto et al. | 53/389.4 X |
| 4,712,357 | 12/1987 | Crawford et al. | 53/450 |
| 4,840,009 | 6/1989 | Rentmeester et al. | |
| 4,909,016 | 3/1990 | Rentmeester et al. | |
| 5,274,984 | 1/1994 | Fukuda | 53/389.4 X |

*Primary Examiner*—Horace M. Culver
*Attorney, Agent, or Firm*—Alston & Bird; Charles H. Fails

[57] ABSTRACT

A temperature measurement and control apparatus (7) and a packaging film loading apparatus (9) for use in a horizontal packaging machine (5). The packaging machine includes a pair of counter-rotating sealing and crimping head assemblies (22, 23), each of which includes a plurality of sealing and crimping heads (32, 36), respectively, which are rotated past a first infrared sensor assembly (57) or a second infrared sensor assembly (61), respectively, for measuring the temperature thereof Each sealing and crimping head includes a generally arcuate sensing arc (80) mounted at the first end (77) thereof, the sensing arcs being rotated past either an upper infrared sensor (59) or a lower infrared sensor (63). The temperature measured by the infrared sensors is passed to a computer (29) where a temperature control program is executed, whereupon the computer signals the individual electrical heating elements (33) of the upper sealing and crimping head assembly, and the electrical heating elements (37) of lower sealing and crimping head assembly to control the temperature of each individual sealing and crimping head therein. A packaging film loading apparatus is also disclosed, which includes a film spool (204) rotatably mounted at one of its ends on a film spool support arm (206), and a double action cylinder (214) for moving the film spool support arm from a lowered loading position to a raised working position with respect to the packaging machine.

17 Claims, 15 Drawing Sheets

HORIZONTAL FORM, FILL, AND SEAL PACKAGING MACHINE

CROSS-REFERENCE TO RELATED PATENT APPLICATIONS

This patent application is a divisional of patent application Ser. No. 08/545,346 filed on Oct. 17, 1995, and now U.S. Pat. No. 5,678,390.

FIELD OF THE INVENTION

This invention relates in general to horizontal food packaging machinery. More particularly, this invention relates to horizontal form, fill, and seal packaging machine for food products having an improved temperature measurement and control apparatus for use with the sealing and crimping heads of the packaging machine, and an improved apparatus for loading rolls of packaging film on the machine.

BACKGROUND OF THE INVENTION

Horizontal food packaging and sealing machines are well known in the art. In these machines a series of spaced food products, for example, crackers or cookies, is moved along a chain conveyor by a series of pins, or flights, toward a packaging film forming shoe. The packaging film will typically be a flexible plastic film adapted for heat sealing. At the forming shoe the product to be wrapped is moved therethrough while a tube of the packaging film is simultaneously formed by the shoe about the product. Thereafter, the articles of product to be sealed are moved in the tube of packaging film toward the sealing and crimping heads of the packaging machine, whereupon individual packages of product are formed, sealed, and crimped apart from one another.

After leaving the forming shoe, the tube of packaging film is pulled by a series of heated fin wheels which form either a bottom or side seal along the length of the product containing film tube. After moving past the fin wheels, the product passes between a pair of opposed and counter-rotating sealing and crimping head assemblies, each assembly having at least one, and as many as four to six separate sealing and crimping heads. Each sealing and crimping head is heated by internal electric heating cartridges so that the heads are hot enough to melt the plastic packaging film in order to seal individual portions of the product. Simultaneous with the sealing of the now formed packages of product, each package is also crimped apart from the other packages by the sealing and crimping heads for further processing.

Each one of the sealing and crimping heads within the respective assemblies is separately heated, and a thermocouple or other temperature measuring device is typically mounted in one of the heads of the upper sealing and crimping head assembly, although there may also be a thermocouple mounted in one of the lower assembly's sealing and crimping heads. It is assumed in the art that each of the sealing heads within each separate assembly will have the same operating temperature as the temperature measured from the one head within the assembly, or assemblies, as the case may be. However, if any one or combination of the sealing heads become too hot they will burn the packaging film. If the sealing and crimping heads become too cold, they may not fully seal the ends of the packages before they are crimped so that the product may pass out of the package, or air will be allowed to enter the package and the product thus becomes stale.

Conventional slip ring assemblies are used for providing electricity to power the heating cartridges positioned within the sealing and crimping heads, and for receiving temperature measurement signals from the thermocouple mounted within at least one of the heads. However, over time, generally in the time frame of 3 to 6 months, the conductive brushes and rings of a conventional slip ring assembly are apt to deteriorate thus resulting in loss of current passed through the slip ring assembly, which in turn results in a loss of critical signal information from the thermocouple concerning head temperature. This in turn leads to decreased precision in the temperature measurement of the heads with an accompanying loss of control over the temperature of the sealing and crimping heads. To combat this problem the packaging machines of the art require frequent maintenance, and are prone to being shutdown for unscheduled maintenance to clean or replace components of the slip ring assembly, resulting both in a loss of productivity and increased operating costs to keep the degree of precision necessary for adequately sealing the film tube.

In current horizontal packaging machines, the heating cartridge provided in each head typically operates over a deadband range of +/−10° to 15°. The cartridges are powered until the temperature of the head reaches the top of the deadband, whereupon the power is cut off and the heating cartridge, and thus the sealing and crimping head, are allowed to cool down toward the bottom of the deadband. Once the bottom limit of the deadband is reached, the heating cartridge is again powered, repeating the cycle. A drawback with this technique, however, is the 20 to 30 degree spread within the deadband may allow the heads to become too hot or too cool for the packaging film being used, as well as the inability of the control system to hold the heads at relatively constant operating and standby temperatures which may thus adversely affect seal quality and packaging production rates. Moreover, as the thermocouple slip rings deteriorate, the deadband limits may be exceeded, also leading to poor sealing/crimping results.

An example of a horizontal food packaging, or wrapping, machine is disclosed in U.S. Pat. No. 3,943,686 to Crawford et al, issued Mar. 16, 1976. Crawford et al disclose an article packaging machine having superposed shafts geared together that mount opposed rotary sealing and crimping heads for sealing and crimping a tube of packaging film between the articles. Each of the crimping jaws of Crawford et al is heated to seal the articles spaced in the tube of thermoplastic packaging film as it is moved alone the machinery, with a conventional slip ring assembly being taught to provide power to the sealing head heating elements.

Another example of a horizontal food packaging machine is disclosed in the patent to Aterianus, U.S. Pat. No. 4,106, 265, issued Aug. 15, 1978. Aterianus teaches a packaging machine which includes a side rotary tucker and opposed counter-rotating sealing and crimping heads having a knife in the upper head and a shoe in the opposed lower sealing and crimping head against which the knife acts. Each of the sealing and crimping heads has an electrical heating cartridge connected to a slip ring assembly for sealing the articles of product within the tube of packaging film.

Still another example of a horizontal packaging machine is disclosed in Crawford et al, U.S. Pat. No. 4,712,357, issued Dec. 15, 1987. Crawford et al teach a horizontal packaging machine of the known type, and include servo motors for driving the sealing and crimping heads of the packaging machine. As a part of the servo drive system for the sealing and crimping heads, the shaft of the lower sealing and crimping head assembly contains a "flag" which extends laterally from the shaft of the lower sealing and crimping head assembly which works in combination with a photocell detector positioned on the machine for signaling the number of times the shaft rotates.

Although great strides have been made in the advance of horizontal packaging machines concerning crimping mechanisms and technique, a need still exists for both a device and a method for more accurately measuring and controlling the temperature of the sealing and crimping heads which is not susceptible to deterioration due to the use of conventional slip ring assemblies, and allows for more precise control of the head temperatures. What is needed is a way to monitor the temperature of the sealing and crimping heads without having to rely upon the known slip ring technology, and its inherent shortcomings, in order to provide greater accuracy, durability, and service life in the measurement and control of the temperature of the sealing and crimping heads in a horizontal food packaging machine.

Another problem with the conventional horizontal packaging machines centers on the difficulty inherent in loading a roll of packaging film onto the machine. In conventional horizontal packaging machines, to include the patents discussed above, at least one roll of packaging film is stationed in a fixed and elevated position with respect to the infeed conveyor of the machine. The packaging film, once loaded on the machine, is then loaded in the machine by passing the film in a generally downward direction over a series of intermediate idler rollers, and a powered feed roller, toward the film forming shoe. Although the loading of rolls of packaging film may not seem a problem in and of itself, when the fact that each individual roll of packaging film can weigh up to 70 pounds is coupled with the fixed and elevated location of the film support spool on the machine, people of smaller stature have a great deal of difficulty in lifting the roll of film overhead, leaning over the machine, and loading the packaging film on the machine. Thus, the need also exists for an improved method and apparatus for loading rolls of packaging film on horizontal packaging machines.

None of the prior art known to the inventors discloses or teaches a temperature measurement and control method, or device, for use with the sealing and crimping heads of an otherwise conventional horizontal food packaging machine which is constructed to avoid the problems of using and relying upon conventional slip ring technology, and which also allows for measuring and separately controlling the temperature of each individual sealing and crimping head within the upper and lower sealing and crimping head assemblies. Thus, the need exists for an improved, yet simple and durable method and device for measuring and controlling the temperature of the sealing and crimping heads of the upper and lower sealing and crimping head assemblies of a horizontal food packaging machine.

In addition, none of the prior art known to the inventors discloses a method nor an apparatus for loading a roll of packaging film on a horizontal packaging machine in which the roll of film is placed onto a film support spool fastened to a support arm, the support arm being pivotally attached at one end to the packaging machine so that the roll of film can be moved from a lowered loading position into a raised working position from which the film is loaded into the packaging machine. Thus, the need exists for an improved method and apparatus for loading a roll of packaging film on a horizontal packaging machine.

SUMMARY OF THE INVENTION

The present invention provides an improved method and device for measuring and controlling the temperature of the individual sealing and crimping heads of the upper and lower rotary crimping head assemblies of a horizontal food packaging machine which overcome some of the design deficiencies of other horizontal packaging machines known in the art. The system includes a horizontal packaging machine having at least one upper rotary sealing and crimping head assembly and at least one opposed counter-rotating lower sealing and crimping head assembly. The rotatable sealing and crimping head assemblies each include a series of heated, circumferentially spaced, radially extending crimping heads which are sized and shaped to seal a succession of regularly spaced articles enclosed in a tube of packaging film passed horizontally therebetween. The temperature of each individual sealing and crimping head is measured as it rotates past one of a pair of temperature sensors mounted in a fixed position on the packaging machine with respect to the sealing and crimping heads. It is then determined whether the temperature of the sealing and crimping heads falls within a temperature deadband set therefor, and the temperature of the sealing and crimping heads is controlled to fall within the deadband.

The method of measuring and controlling the temperature of the sealing and crimping heads includes the step of intermittently measuring the temperature of each sealing and crimping head, and then either intermittently, or continuously, determining an average temperature for all of the sealing and crimping heads. The method of this invention further includes the step of controlling the temperature of the sealing and crimping heads to fall within a deadband in the range of from generally two degrees above to generally two degrees below a fixed temperature setpoint, and allows for the step of separately controlling the temperature of each individual sealing and crimping head.

The device for practicing the method of this invention includes separate temperature sensors for measuring the temperature of each of the sealing and crimping head assemblies, the sensors being mounted in a fixed position on the packaging machine with respect to, and spaced from, each sealing and crimping head assembly. A computer is used for processing the temperatures received from the sensor to determine whether the temperature of each sealing and crimping head assembly falls within the temperature deadband, and for controlling the temperature of the sealing and crimping heads to fall within the deadband.

The temperature sensors of this invention measure the radiant heat of a generally arcuate sensing arc mounted on the end of each sealing and crimping head rotated past its respective temperature sensor. The sensing arcs of the heads in each assembly together form a generally circular and continuous sensing ring positioned perpendicularly with respect to the axes of the upper and lower sealing and crimping head assemblies respectively from which the radiant heat of each sealing and crimping head can be measured as temperature for further processing and control.

The invention also includes both an improved method and a device for loading a roll of packaging film on a film spool supported on a horizontal packaging machine, which includes placing the roll of packaging film on the film spool, securing the roll of packaging film on the film support spool, moving a film spool support arm, the arm being pivotally supported at one of its ends on the packaging machine and having the film spool mounted at the other of its ends, from a lowered loading position into a raised working position with respect to the packaging machine, and then loading the film into the packaging machine.

Thus, it is an object of this invention to provide a horizontal packaging machine with an improved apparatus and method for measuring and controlling the temperature of the upper and lower sealing and crimping head assemblies.

An additional object of this invention is to provide an improved horizontal packaging machine which provides improved control over the temperature measurement of each individual sealing and crimping head.

Another object of this invention is to provide an improved horizontal packaging machine which does not utilize conventional slip ring technology as a part of the apparatus for measuring the sealing and crimping head assembly temperatures.

Still another object of the invention is to provide an improved horizontal packaging machine which more easily allows for the loading of a spool of packaging film thereon.

Yet another object of this invention is to provide an improved horizontal packaging machine which both simplifies and saves time in the process of loading a roll of flexible packaging film thereon.

An additional object of the present invention is to provide an improved horizontal packaging machine which is simple in design and operation, is inexpensive to construct, and is durable and rugged in structure.

Thus, these and other objects, features, and advantages of the invention will become apparent upon reading the specification when taken in conjunction with the accompanying drawings, wherein like characters of reference designate corresponding parts throughout the several views.

DETAILED DESCRIPTION

Figure 1:
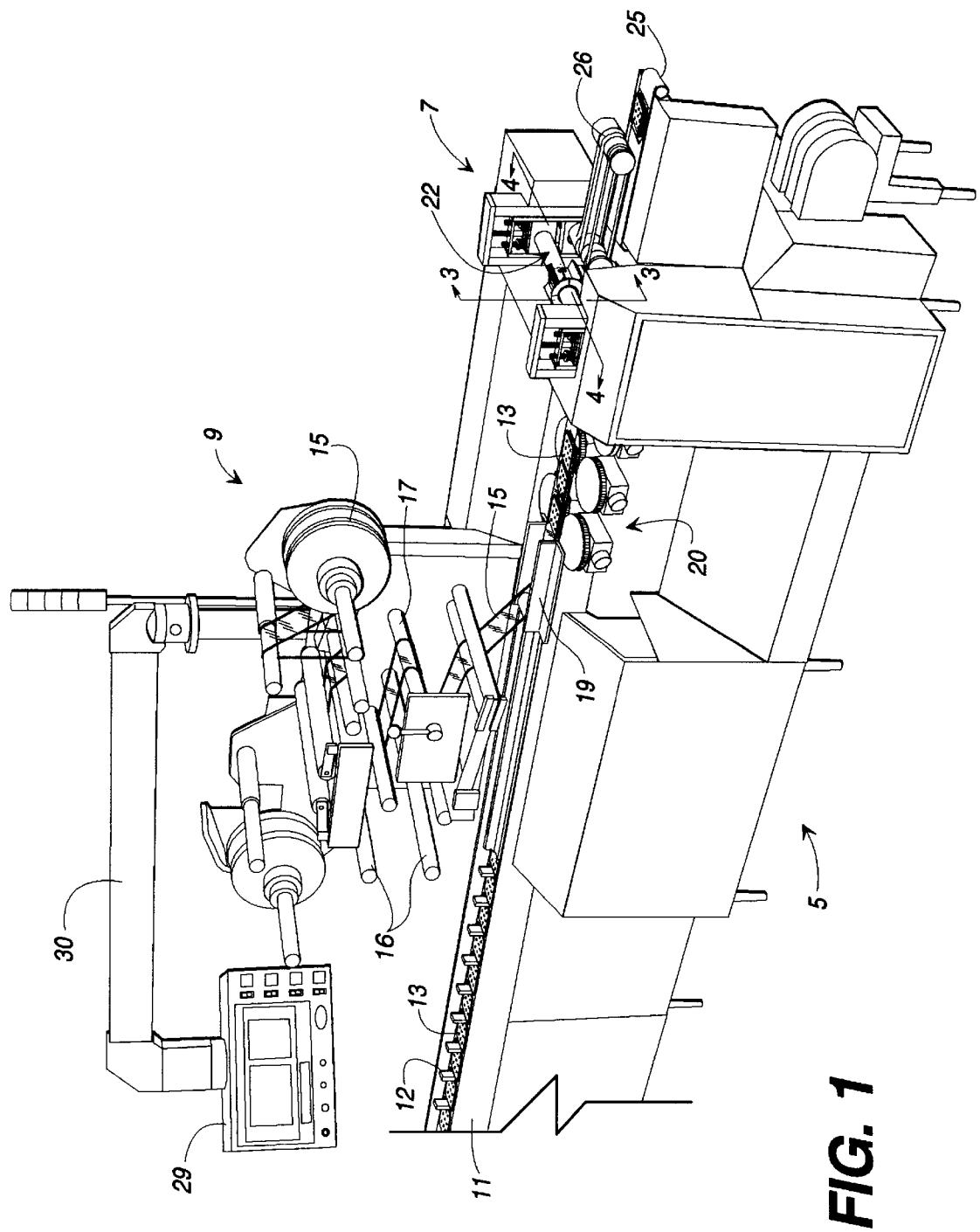
FIG. 1 is a perspective view of a horizontal packaging machine including the novel aspects of this invention.

Referring now in detail to the drawings, in which like reference numerals indicate like parts throughout the several views, numeral 5 of FIG. 1 refers to a horizontal packaging machine of the type known in the art. Numeral 7 of FIG. 1 refers to a preferred embodiment of the novel temperature measurement and control apparatus of the invention, and numeral 9 of FIG. 1 illustrates a preferred embodiment of the novel packaging film loading apparatus of this invention.

Packaging machine 5 illustrated in FIG. 1 includes an elongated infeed chain conveyor 11, from which a spaced series of generally upright timing pins 12 extend. Timing pins 12 form a series of flights therebetween in which a spaced series of articles of product 13 are transported along the infeed portion of the packaging machine toward the packaging and outfeed portions of the machine. A roll of packaging film 15, supported on packaging film loading apparatus 9, is passed over a series of idler rollers 16, through a power feed roller 17, and toward a forming shoe 19. The articles of product 13 are conveyed by infeed chain conveyor 11 toward forming shoe 19, at which point packaging film 15 is formed as an elongated continuous tube about the spaced articles of product 13. Thereafter, the spaced articles of product, now enclosed in a tube of packaging film, are passed through a fin wheel assembly 20 in which the fin wheels form either a continuous bottom seal, or side seal, thus forming the continuous and elongated tube of packaging film about the product.

Figure 8:
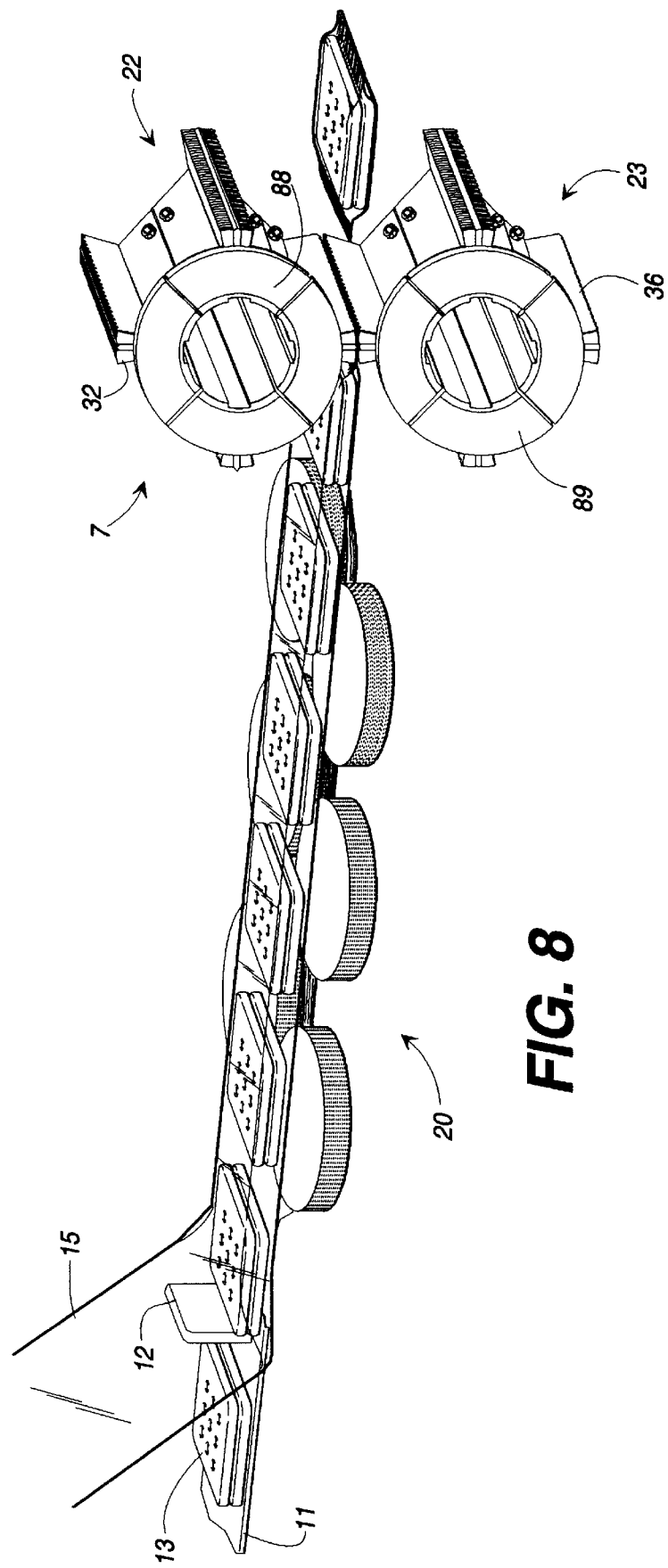
FIG. 8 is a schematic illustration of the manner in which articles of product are packaged in a preferred embodiment of the packaging machine of this invention.

Fin wheel assembly 20 is a conventional fin wheel assembly, and is illustrated generally in FIG. 8. Fin wheel assembly 20 typically includes three pairs of spaced fin wheels, the packaging film being drawn over forming shoe 19 by the first pair of fin wheels. The latter two pairs of fin wheels are heated and form the continuous "fin" seal along the length of the film tube. Packaging film 15 is a flexible plastic film, and is adapted to be heat sealed by the fin wheels, and by upper sealing and crimping head assembly 22 and lower sealing and crimping head assembly 23, illustrated generally in FIG. 1, and in greater detail in FIGS. 2–4.

After being sealed and crimped into individual packages by sealing and crimping head assemblies 22 and 23, the individual packages of product are moved onto an output conveyor 25, typically a belted conveyor, with an output tubing belt conveyor 26 positioned thereabove to align the packages of product for further processing.

Horizontal packaging machine 5 includes a computer 29, the computer being supported on packaging machine 5 by support arm 30. As described in greater detail below, computer 29 forms a portion of temperature measurement and control apparatus 7, as well as controlling the operation of the packaging machine.

Figure 2:
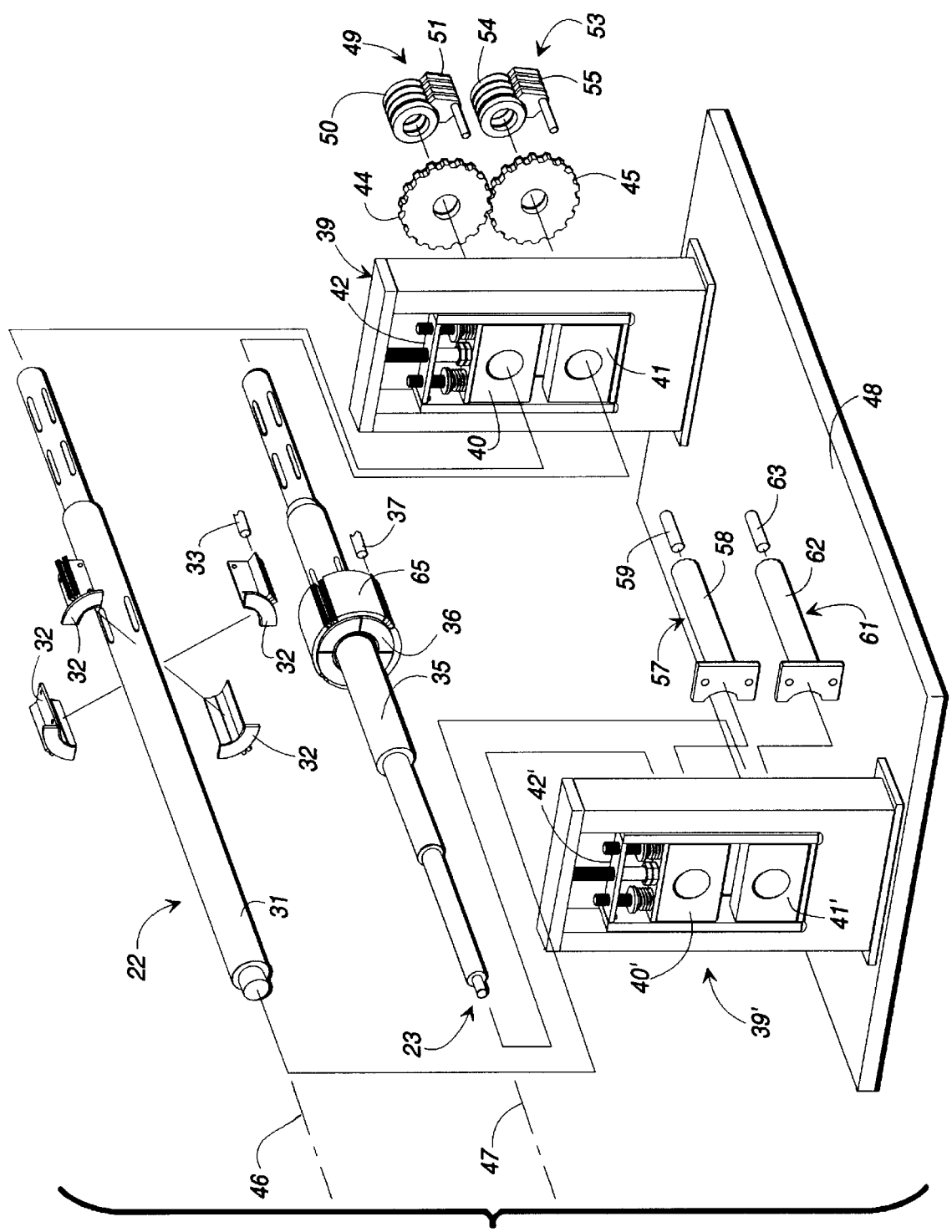
FIG. 2 is an exploded perspective view of the sealing and crimping head assemblies of the horizontal packaging machine illustrated in FIG. 1.
Figure 3:
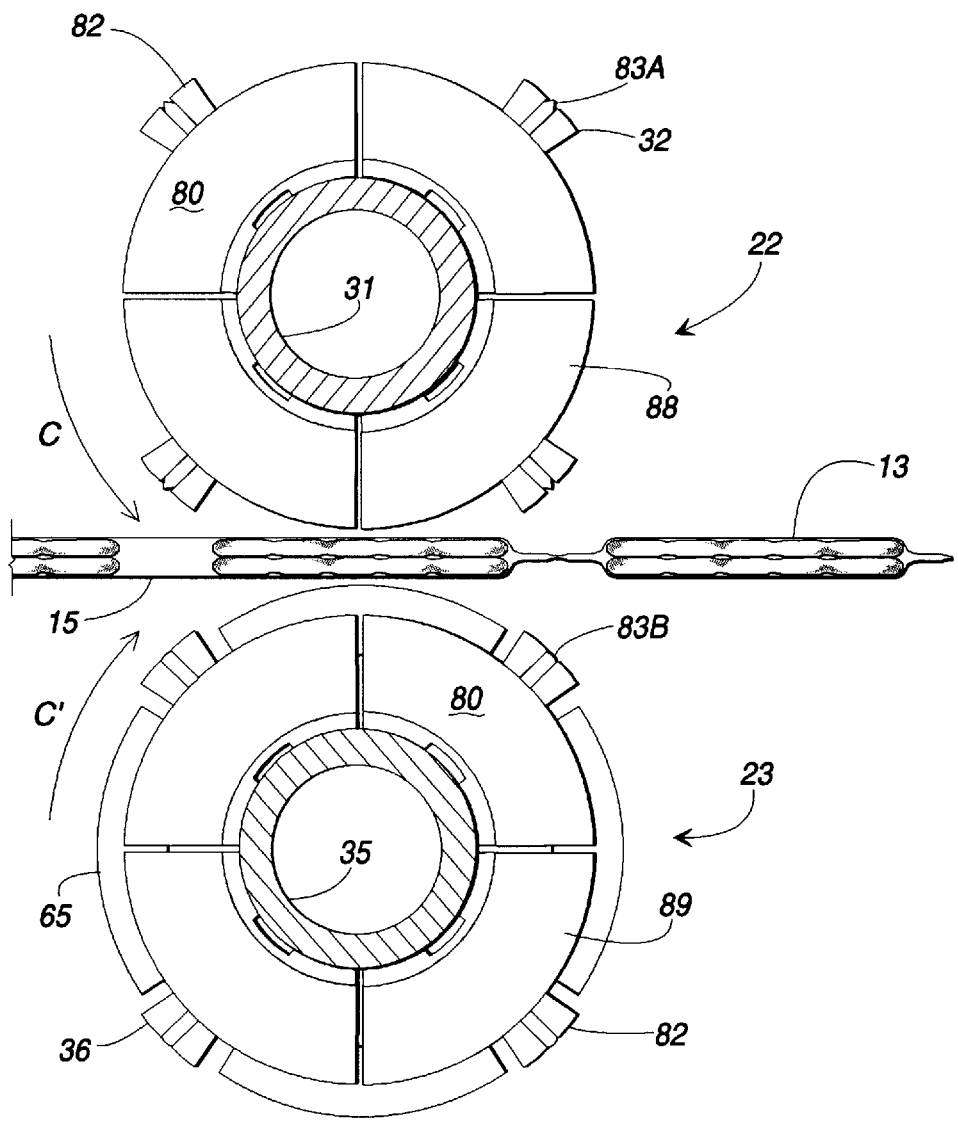
FIG. 3 is a partial side elevational view along line 3—3 of FIG. 1.
Figure 4:
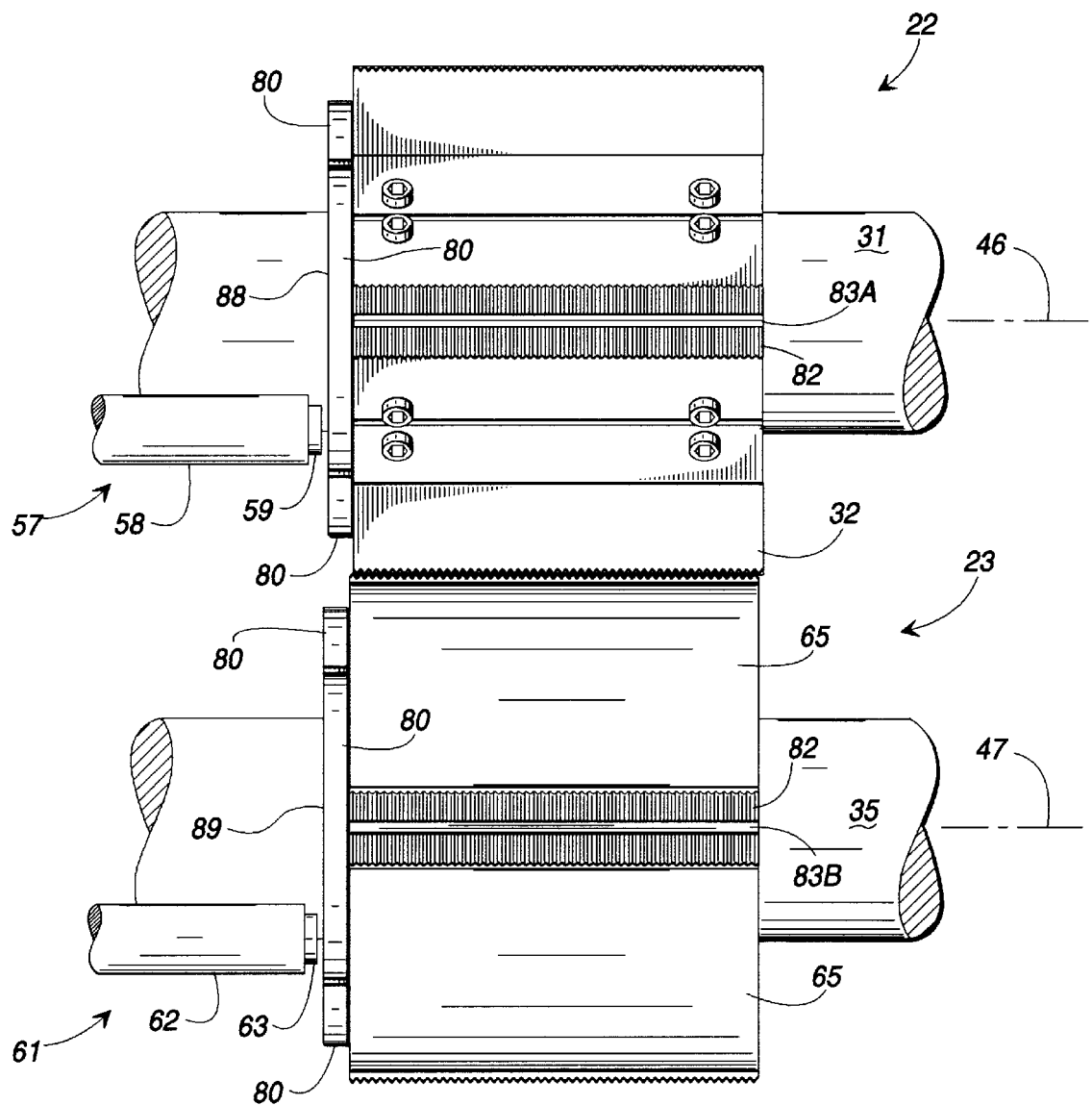
FIG. 4 is a partial front elevational view along line 4—4 of FIG. 1.

Referring now to FIGS. 2–4, temperature measurement and control apparatus 7, upper sealing and crimping head assembly 22, and lower sealing and crimping head assembly 23 are illustrated in greater detail. Turning first to FIG. 2, upper sealing and crimping head assembly 22 includes shaft 31 on which a plurality, here four, of sealing and crimping heads 32 are mounted. Within each one of sealing and crimping heads 32 is an electric heating cartridge 33 (only one illustrated). Electric heating cartridge 33 is a conventional resistive heating element actuated by a slip ring of the type known to those in the art.

Similarly, lower sealing and crimping head assembly 23 has a shaft 35 on which four lower sealing and crimping heads 36 are mounted. Sealing and crimping heads 36 each also include an electric heating cartridge 37 (only one illustrated) which is generally identical to each of electrical heating cartridges 33 used in the upper sealing and crimping head assembly.

Each of the sealing and crimping head assemblies 22 and 23 is supported within a pair of opposed slide frame assemblies, right side slide frame assembly 39 and a left side slide frame assembly 39', both of which are generally identical to one another. Each of slide frame assemblies 39 and 39' include an upper bearing block 40 and 40', respectively, for rotatably supporting shaft 31, and a lower bearing block 41 and 41', respectively, for rotatably supporting shaft 35. A cap screw assembly 42 and 42', respectively, is provided at the top of each slide frame assembly for providing the means for adjusting the vertical distance between upper sealing and crimping head assembly 22 and lower sealing and crimping head assembly 23 in order to permit the spaced articles of product 13 to pass therebetween while forming a heated and crimped seal at the end of each package of product 13. At one end of shaft 31 a timing gear 44 is provided, and at the corresponding end of shaft 35 a second timing gear 45 is provided, so that each shaft rotates at a fixed 1 to 1 ratio. Shafts 31 and 35, and thus sealing and crimping assemblies 22 and 23, counter-rotate with respect to each other, and are fixed in position parallel to one another along separate longitudinal axes 46 and 47, respectively.

Still referring to FIG. 2, sealing and crimping head assemblies 22 and 23, as well as slide frame assemblies 39 and 39' are held in position with respect to one another by frame 48. Frame 48 is itself positioned on packaging machine 5 as illustrated generally in FIG. 2.

At one end of shaft 31 a first slip ring assembly 49 is provided through which electricity is transmitted to each of the heating cartridges 33 within each one of sealing and crimping heads 32. Although FIG. 2 shows a slip ring assembly 49 having four separate rings 50 and wiper/brushes 51, it is anticipated that a single slip ring assembly having a single slip ring pair 50 and a single wiper/brush pair 51 can be provided if each of sealing and crimping head 32 is powered, heated, and controlled together, rather than separately, as shown by the apparatus in FIG. 2. As shown in FIG. 2, since a separate ring 50 and wiper/brush 51 is provided for each of electrical heating cartridges 33, it is possible that each heating cartridge can be controlled separately to take full advantage of the novel aspects of this invention. In similar fashion, the corresponding end of shaft 35 includes a slip ring assembly 53, slip ring assembly 53 having four rings 54 and four wiper/brushes 55 for powering each of electrical heating cartridges 37 positioned within each sealing and crimping head 36. Again, and although not illustrated here, a single ring pair 54 and a wiper/brush pair 55 can be provided for commonly powering and controlling each of electrical heating cartridges 37 together if so desired. It is anticipated, however, that each of heating cartridges 33 and 37 will be individually powered and controlled. In the event that heating cartridges 33 are commonly controlled, then it is anticipated that each of heating cartridges 37 would also be commonly controlled.

Referring now to FIGS. 2 and 4, temperature measurement and control apparatus 7 includes an upper infrared temperature sensor assembly 57, and a lower infrared temperature sensor assembly 61. Upper infrared sensor assembly 57 includes a mounting bracket 58 spaced radially from the axis of rotation 46 of the upper crimping head assembly and positioned on upper bearing block 40' within left side slide frame assembly 39'. An infrared temperature sensor 59 is positioned within mounting bracket 58, mounting bracket 58 being held in a fixed position with respect to the path of rotation of each of upper sealing and crimping heads 32 which rotate past sensor 59. In similar fashion, lower infrared sensor assembly 61 is mounted on lower bearing block 41' of left side slide frame assembly 39', spaced below, and parallel to, upper infrared sensor assembly 57. Lower infrared sensor assembly 61 includes a mounting bracket 62 spaced radially from the axis of rotation 47 of the lower crimping head assembly and fastened to lower bearing block 41', and an infrared temperature sensor 63 positioned therein. Mounting bracket 62 is held in fixed position with respect to the path of rotation of each of lower sealing and crimping heads 36 which rotate past infrared temperature sensor 63.

Figure 5:
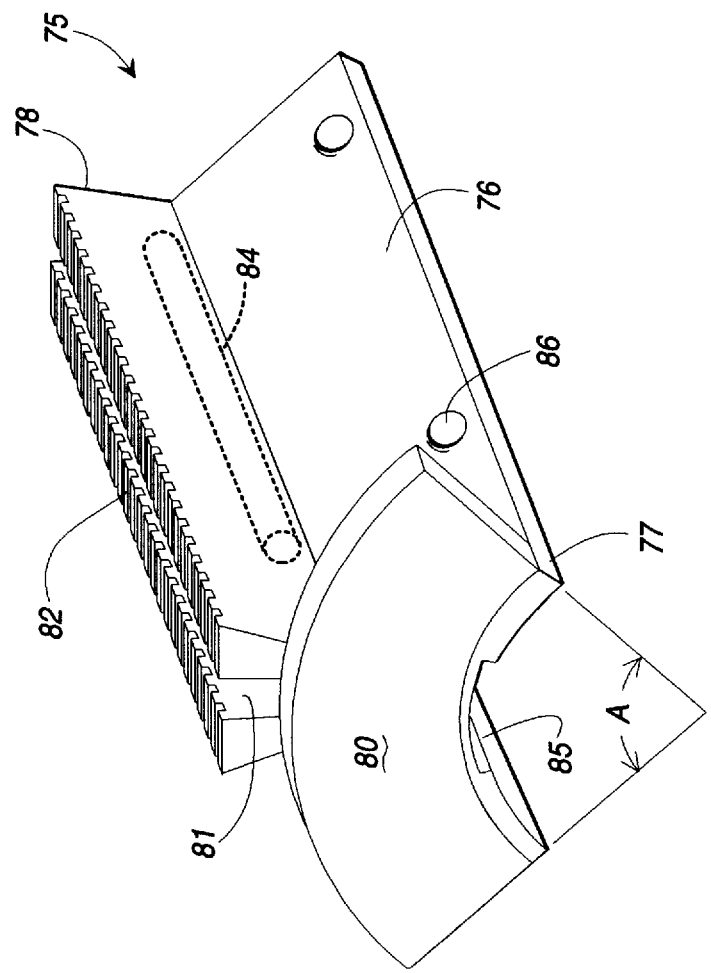
FIG. 5 is a perspective view of one of the sealing and crimping heads as shown in FIGS. 2–4.

Turning now to FIG. 5, a sealing and crimping head 75, otherwise identical to either of sealing and crimping heads 32 or 36, is illustrated in greater detail. Sealing and crimping head 75 includes a body 76, having a first end 77 and a spaced second end 78. A generally arcuate sensing arc 80 is positioned at first end 77. Sensing arc 80 is welded to body 76 with a fillet and plug weld, sensing arc 80 being placed flush against body 76 so that the heat generated by one of heating cartridges 33 or 37 positioned within heating element chamber 84 will be passed to the sensing arc, the temperature of which will be measured by either one of infrared temperature sensors 59 and 63, dependent on whether sealing and crimping head 75 is one of upper sealing and crimping heads 32, or one of lower sealing and crimping heads 36.

Still referring to FIG. 5, sensing arc 80 will form that portion of a circle which is directly proportional to the number of sealing and crimping heads 32 or 36 provided as a part of upper sealing and crimping head assembly 22, or lower sealing and crimping head assembly 23, respectively. For example, if there are four sealing and crimping heads within each head assembly, then sensing arc 80 will extend through an angle, shown by the designation "A" in FIG. 3, of approximately 90°. If there are only two sealing and crimping heads provided within each assembly, angle A will extend approximately 180°. Similarly, if there are six sealing and crimping heads, angle A will only extend through an approximate 60° range. In this manner, sensing arcs 80 together define a generally continuous and circular sensing ring at the end of each sealing and crimping head assembly, of which the temperature is sensed by infrared temperature sensor assemblies 57 and 61, respectively. First sensing ring 88 and second sensing ring 89 are shown in greater detail in FIGS. 3 and 8, in which four upper sealing and crimping heads 32 are provided, and four lower sealing and crimping heads 36 are provided, heads 32 and 36 counter-rotating with respect to one another as shown by the arrows designated "C" and "C'" (FIG. 3). As shown in FIG. 4, each sensing ring is positioned at the end of each sealing and crimping head assembly which rotates past upper infrared temperature sensor assembly 57 and lower infrared temperature sensor assembly 61, respectively. In addition, and as shown in FIG. 4, sensing rings 88 and 89 are positioned perpendicularly with respect to longitudinal axes 46 and 47 of the upper and lower sealing and crimping head assemblies 22 and 23, respectively.

Returning now to FIGS. 3 and 4 each sealing and crimping head 32 or 36 is provided with its own sensing arc so that each pair of sealing and crimping heads 32 and 36 can be adjusted axially with respect to the other so that sealing surface 82 (FIG. 5) will fit within each other to form the end seal for each package of product 13 (FIG. 3). The width of sealing surface 82, illustrated best in FIG. 5, will be determined by the product being packaged, and by the width of film 15 used to package the product. The distance between the outside edge of heads 82 will also be determined by the size of the package being sealed, and by the size of the desired seal to be formed. In a typical machine, sealing surfaces 82 have a combined depth of approximately one inch. With the exception of sensing arcs 80, sealing and crimping heads 32 and 36 are generally conventional.

As shown in FIG. 5, an elongated slot 81 extends between each sealing surface 82, into which either a knife 83A (FIG. 3) or a corresponding anvil 83B (FIG. 3) is provided for the purposes of crimping each package of product 13 apart from the other. This is also illustrated in FIG. 3, in which it is seen that upper sealing and crimping head 32 and lower sealing and crimping head 36 have formed a crimped seal at the first end of the film tube in which the spaced series of product 13 is positioned, with a second pair of sealing and crimping heads moving toward each other so that knife 83A will act against anvil 83B to crimp the second end of the package of product 13 positioned between the sealing and crimping heads. Also, as known to those skilled in the art, an arcuate spacer bar 65 will be fit between each of sealing and crimping heads 36 of lower sealing and crimping head assembly 23 so that the elongated and continuous film tube of product 13 will pass over and between the heads of lower sealing and crimping head assembly 23 so that the product cannot otherwise become trapped within and between the sealing and crimping heads.

Still referring to FIG. 5, each of sealing and crimping head 75 has a base section 85 of a generally arcuate configuration, in which a plurality, here four, of fastener openings 86 are defined and extend therethrough so that a threaded fastener (not illustrated) can be passed therethrough to threadably fasten each of sealing and crimping heads 32, 36 to shafts 31, 35, respectively.

Each of sealing and crimping heads 32 and 36 is constructed of a ferrous material with uniform heat distribution characteristics, to include high carbon steels and tool grade steels. It is anticipated here that the heads will be made of a carbon steel so that they will evenly, and uniformly, distribute heat along each of sealing surfaces 82 for uniformly sealing the articles of product 13 within the tube of film 15, and for heating each of sensing arcs 80. Each sensing arc 80 may be constructed of the same material as is sealing and crimping heads 32 and 36, but it is also anticipated that sensing arcs 80 may also be made of aluminum If sensing arcs 80 are made of aluminum, it is then anticipated that the sensing arcs will be bolted or secured to sealing and crimping heads 32 and 36 with a threaded fastener, rather than being welded to the heads. In addition, the exterior surface of each sensing arc 80, positioned adjacent to and facing toward each infrared temperature sensor assembly, respectively, is painted black so that infrared temperature sensors 59 and 63 can sense the temperature of each sensing arc 80, respectively, in uniform fashion thus minimizing hot spots or cools spots within each sensing arc.

Referring now to FIG. 4, it is anticipated that when upper and lower sealing and crimping heads 32 and 36 are moved axially with respect to each other to seat sealing surface 82 properly, that they will move no more than $\frac{1}{32}$ to $\frac{1}{16}$ of an inch along longitudinal axes 46 and 47. Thus, each of infrared temperature sensor assemblies 57 and 61 is positioned within $\frac{3}{16}$ to $\frac{1}{4}$ of an inch from sensing rings 88 and 89, respectively. In this way, no matter what axial movement occurs within the sealing and crimping heads of the assemblies, the sensing arcs will be in the temperature sensing range of each infrared temperature sensor so that an accurate temperature measurement of the sealing and crimping heads can be obtained.

By using infrared temperature sensors mounted in a fixed position on the packaging machine, the problems of the prior art are overcome. Infrared temperature assemblies 57 and 61 do not depend on a thermocouple positioned within any one or combination of the sealing and crimping heads, the signal current of which will be passed through a slip ring assembly subject to deterioration and break down over time. A typical slip ring assembly will last in the range of three to six months before it needs to be replaced due to the deterioration of the slip ring in conjunction with the wiper/brush riding thereon. Moreover, slip ring assemblies typically require cleaning and adjustment every two weeks or so. Here, however, by using infrared temperature sensors in conjunction with the sensing arcs and sensing rings of this invention, it is anticipated that temperature measurement and control apparatus 7 can be utilized for much greater periods of time, perhaps even over a period of years, without major adjustment and repair. The only part of the temperature measurement and control apparatus which may be subject to repair over time would be each one of infrared temperature sensors 59 and 63. However, modern infrared temperature sensors have proven to be an extremely durable, efficient, and economic means for sensing temperature.

It is anticipated that a time period of approximately 100 milliseconds is required in which to obtain a temperature reading from each passing head. If sensing arcs 80 were not provided on the first end 77 (FIG. 5) of each sealing and crimping head 32, 36, respectively, less than 100 milliseconds may be provided in which to sense the temperature there. Thus, the sensing arc is used to provide a "window of opportunity" in which the temperature of the sealing and crimping head can be sensed.

For example, if a horizontal packaging machine processes 1,000 articles of product 13 per minute, and has four sealing and crimping heads within each of upper sealing and crimping head assemblies 22 and 23, each crimper will pass by the infrared temperature sensors every 25 milliseconds. By providing sensing arcs 80, the window of opportunity is extended from 25 milliseconds to 100 milliseconds so that one temperature reading of each sensing arc occurs per rotation. It is anticipated that as infrared temperature sensor technology advances, for example when an infrared temperate sensor with a scan rate of 25 milliseconds becomes available, this improved sensor could possibly be used on packaging machine 5, whereupon sensing arcs 80 may not be needed, rather the temperature of each sealing and crimping head would be detected by passing either first end 77 or second 78 (FIG. 5) past infrared temperature sensors 59 and 63 (FIG. 4). Also, and by way of example, if the packaging machine described above was only processing five hundred pieces per minute, the infrared temperature sensors would then be able to take two temperature readings per sensing and crimping head, again by measuring the temperature of each sensing arc 80 as it passes thereby.

Thus, a unique feature of temperature and measurement control apparatus 7 of this invention is that it provides much greater and more accurate temperature measurement of each individual sealing and crimping head, and not just of the sealing and crimping head assemblies. This, in turn, enables the discrete control of the temperature of each electrical heating element 33 within upper sealing and crimping heads 32, and each electrical heating element 37 within each lower sealing and crimping head 36. Based upon the control methodology described in greater detail below, this invention thus permits the control of the temperature of each sealing and crimping head to fall within the deadband of +/−2° with respect to a predetermined temperature setpoint, as opposed to the +/−10° to 15° deadband currently available in the art.

Figure 6A:
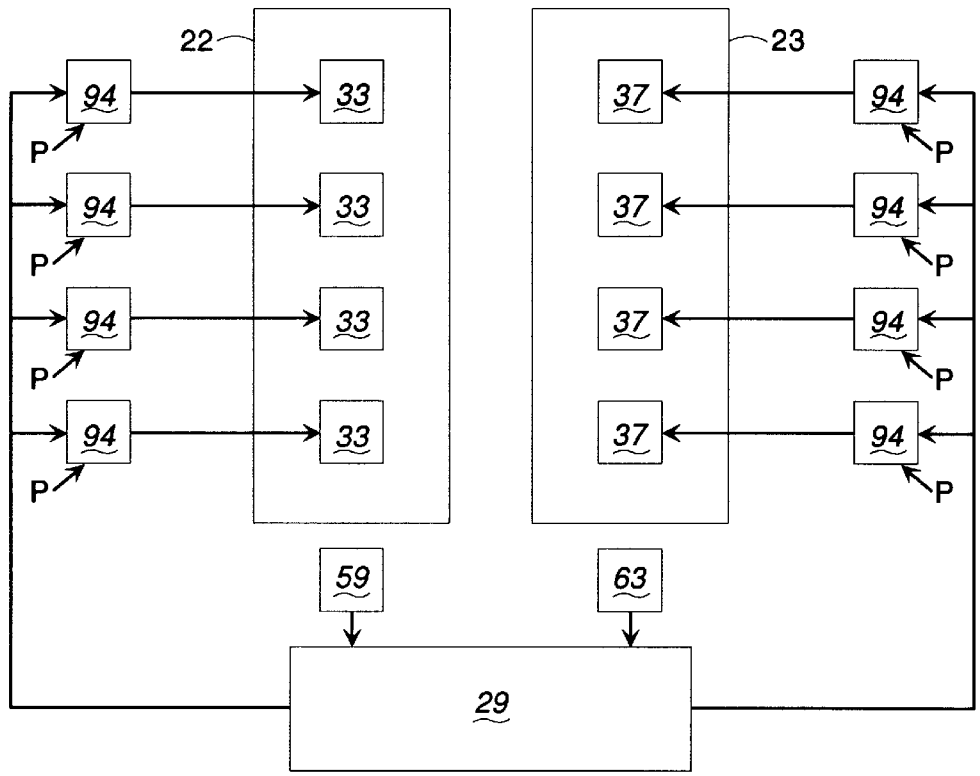
FIG. 6A is a schematic illustration of the temperature measurement and control apparatus of the horizontal packaging machine illustrated in FIG. 1
Figure 6B:
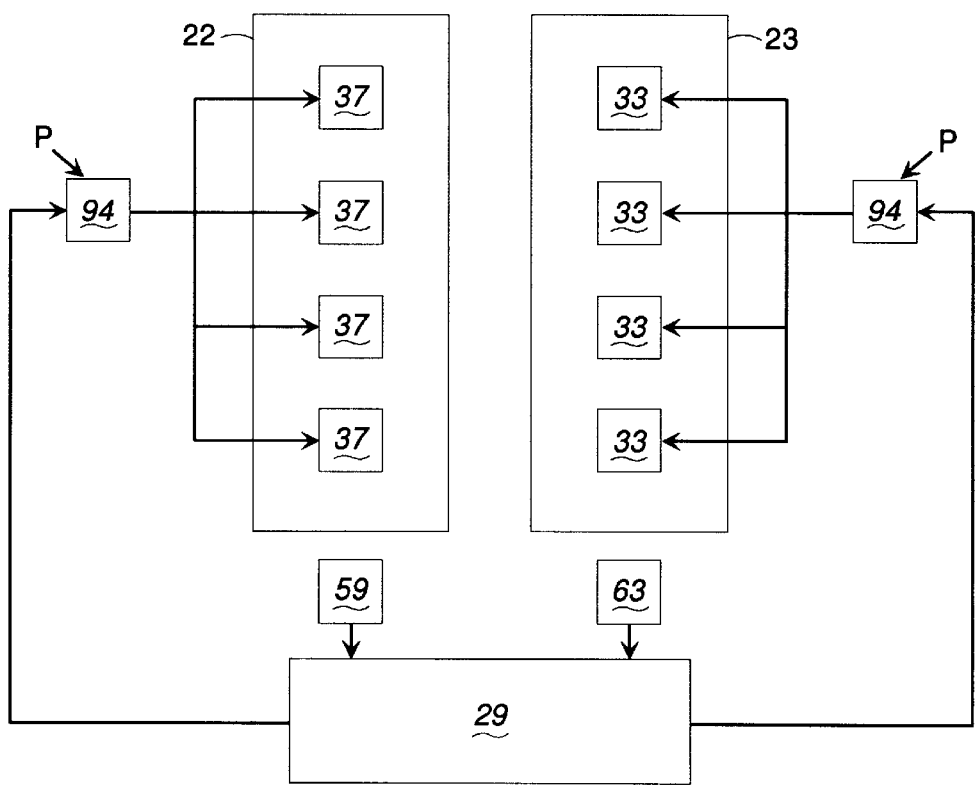
FIG. 6B is a schematic illustration of an alternate embodiment of the temperature measurement and control apparatus of the horizontal packaging machine illustrated in FIG. 1.
Figure 6C:
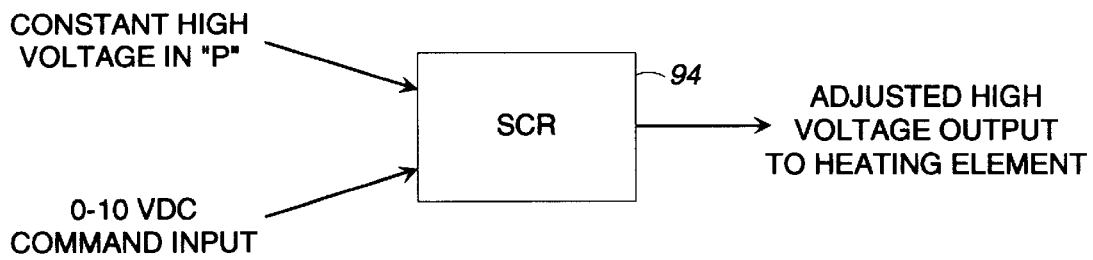
FIG. 6C is a schematic illustration of one of the silicon controlled rectifiers shown in the apparatus illustrated in FIGS. 6A and 6B.

FIGS. 6A–6C are schematic illustrations of how temperature measurement and control apparatus 7 controls the temperature of upper sealing and crimping heads 32 and lower sealing and crimping heads 36. Upper sealing and crimping head assembly 22 and lower sealing and crimping head assembly 23 are schematically illustrated in FIG. 6A. As shown in FIG. 2, an electrical heating element 33 is provided for each sealing and crimping head 32, and an electrical heating element 37 is provided for each lower sealing and crimping head 36. Thus, and as illustrated in FIG. 6A, there are four electrical heating elements 33 positioned with respect to first infrared temperature sensor 59, and four electrical heating elements 37 positioned with respect to second infrared temperature sensor 63. As described above, the infrared temperature sensors will measure the temperature of each sealing and crimping head via sensing arcs 80 (FIG. 3), and provide this information to computer 29 in which the control program illustrated in FIGS. 7A–7E, discussed in greater detail below, is executed. Thereafter, in response to the execution of the temperature control routine, control signals are sent to each one of the heating elements, respectively. However, positioned in line before each of the heating elements is a silicon controlled rectifier 94, which converts a zero to ten volt DC input to a proportionately adjusted high voltage output. In FIG. 6A, a silicon controlled rectifier 94 is provided for each electrical heating element so that the temperature of each heating element can be controlled discretely from the others.

FIG. 6C schematically illustrates how the silicon controlled rectifier 94 works. As discussed above, a zero to ten volt DC command input is received from computer 29. At the same time, a constant high voltage input, designated by the letter "P," is also being received by the silicon controlled rectifier, the high voltage input being controlled proportionately to the control signal from computer 29 to increase or decrease the power to each of heating elements 33 and 37, respectively, to thus increase or decrease the temperature of each heating element.

By providing a silicon controlled rectifier which converts a DC control input into a proportional high voltage output, the constant on-off cycling of the heater element as known in the art is not required. Rather, the heater is constantly on, but not necessarily at full power. The temperature of each heating element will be controlled by a value determined from computer 29, based upon data signals received from infrared temperature sensors 59 and/or 63.

FIG. 6B illustrates how the heating elements of the upper and lower sealing and crimping head assemblies 22 and 23 can be controlled as groups within each assembly. Unlike FIG. 6A, in FIG. 6B a zero to ten volt DC control signal, or command input, is emitted by computer 29 and received by a single silicon controlled rectifier 94 for each sealing and crimping head assembly. Silicon controlled rectifier 94 in turn controls each one of the heating elements of the upper and/or lower sealing and crimping head assemblies, respectively, together as a group.

The control methodology practiced by temperature measurement and control apparatus 7 is illustrated in FIGS. 7A–7E, which together are composite flow charts of the control routine practiced by this invention. The program illustrated in FIGS. 7A–7E is executed within computer 29 (FIG. 1, FIGS. 6A and 6B).

Figure 7A:
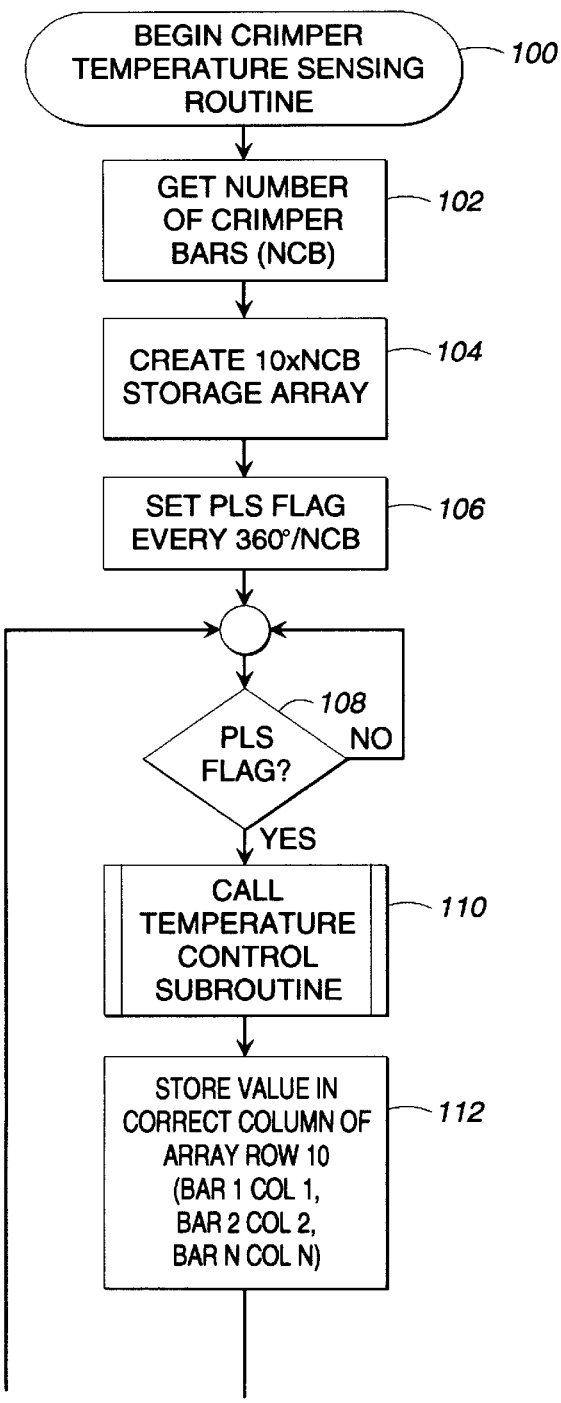
FIGS. 7A and 7B are a composite flow chart of the sealing and crimping head temperature sensing routine of this invention.
Figure 7B:
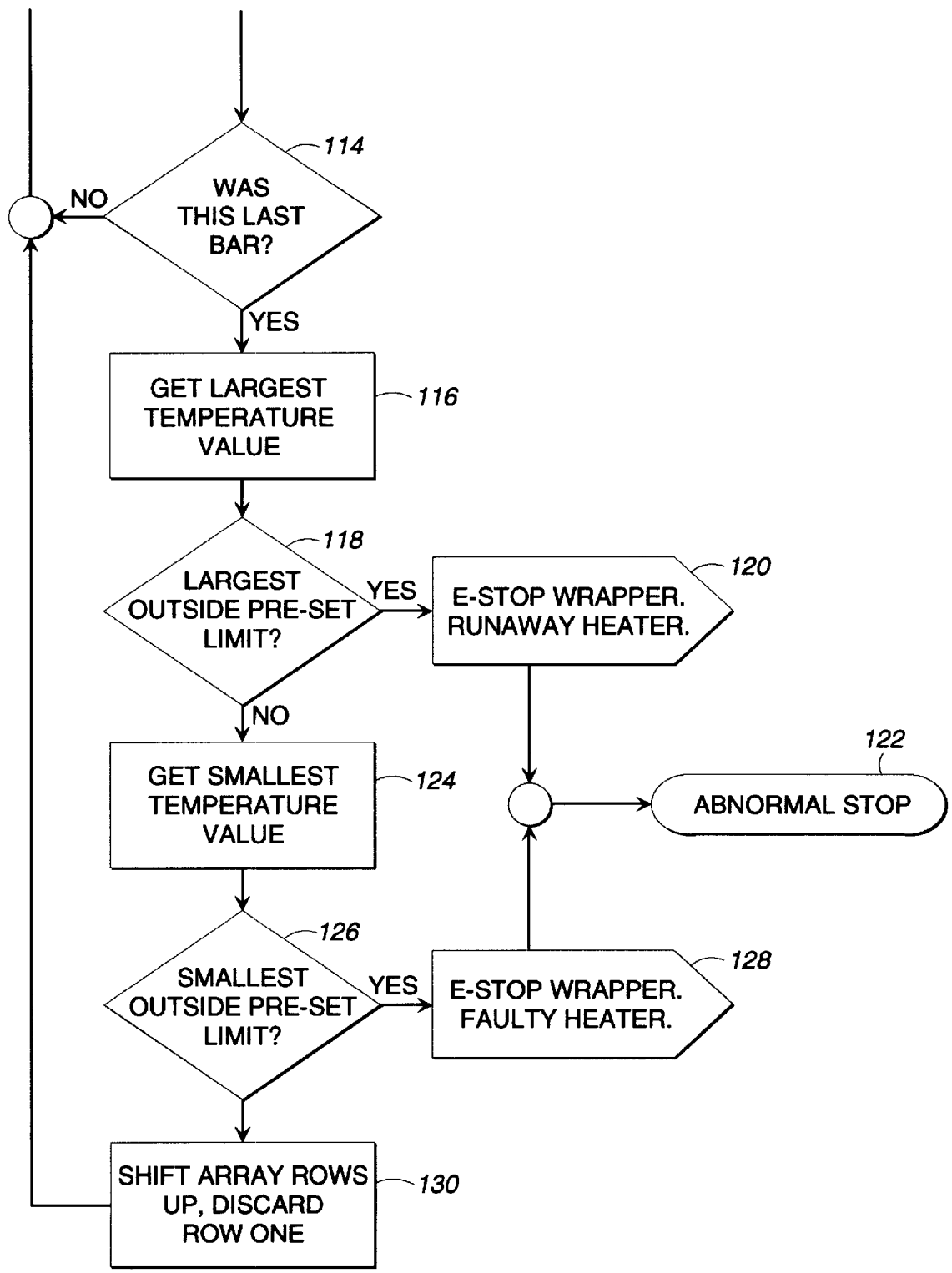

The first step of the control routine is illustrated in FIG. 7A, as step 100, in which the sealing and crimping head temperature sensing routine is begun. Once the process has begun, the program proceeds to step 102, in which the number of sealing and crimping heads is determined, at which time the program proceeds to step 104 and creates a storage array in which the number of sealing and crimping heads is multiplied by ten. The storage array of step 104 has ten rows and a number of columns equal to the number of heads created. For example, if there are four crimper bars, there will be a 10×4 array in which there will be ten rows and four columns, each row containing a temperature measurement of that crimper bar during ten successive revolutions of the crimper and sealing head assembly. Thereafter, a programmable limit switch (PLS) flag, the programmable limit switch being a part of the control program itself and not being separate hard wired component, is set in step 106 to single the presence of each sealing and crimping head. As shown in FIGS. 7A–7E, the sealing and crimping heads may also be referred to as crimper bars.

Figure 7C:
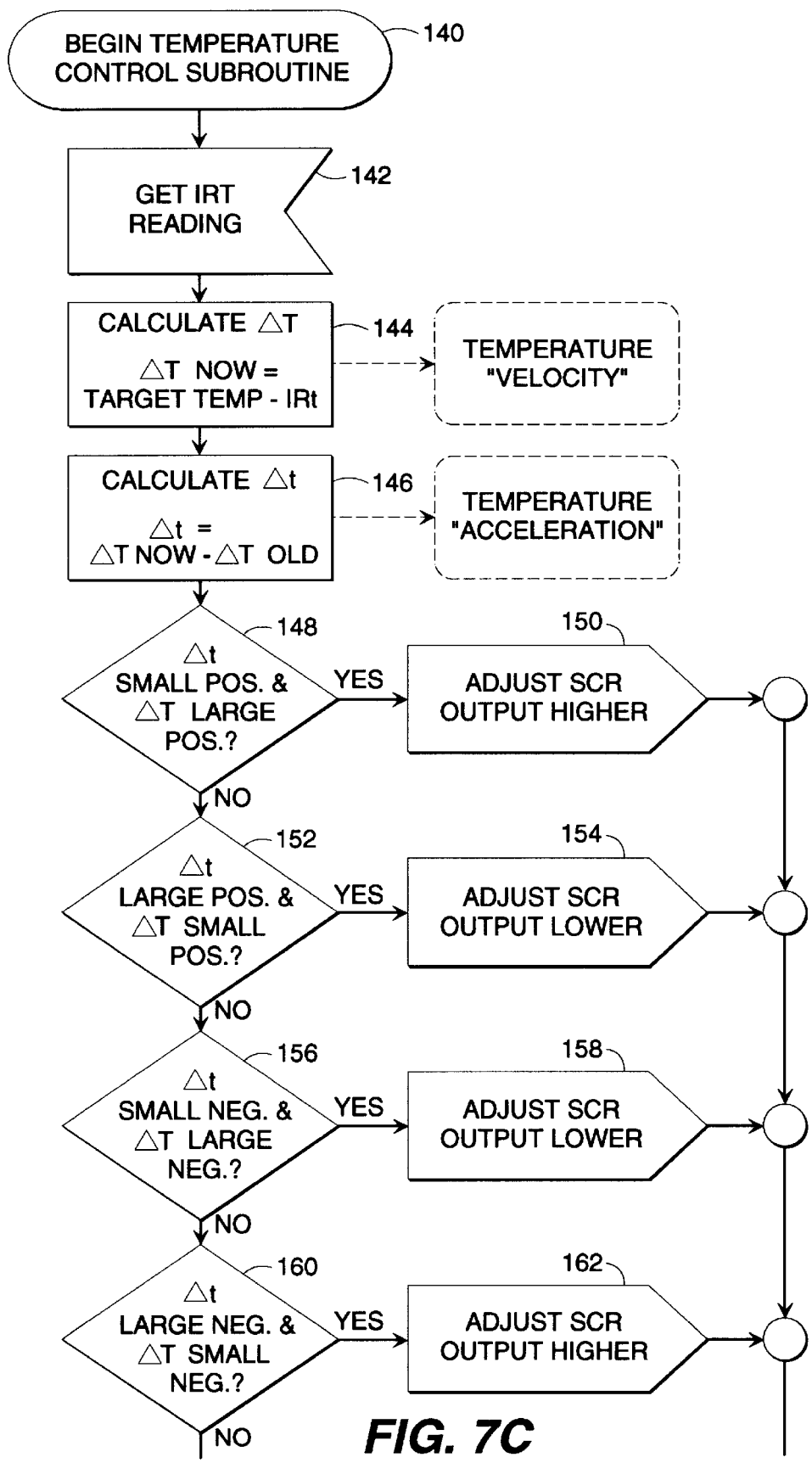
FIGS. 7C, 7D, and 7E are a composite flow chart of the sealing and crimping head temperature control sub-routine
Figure 7D:
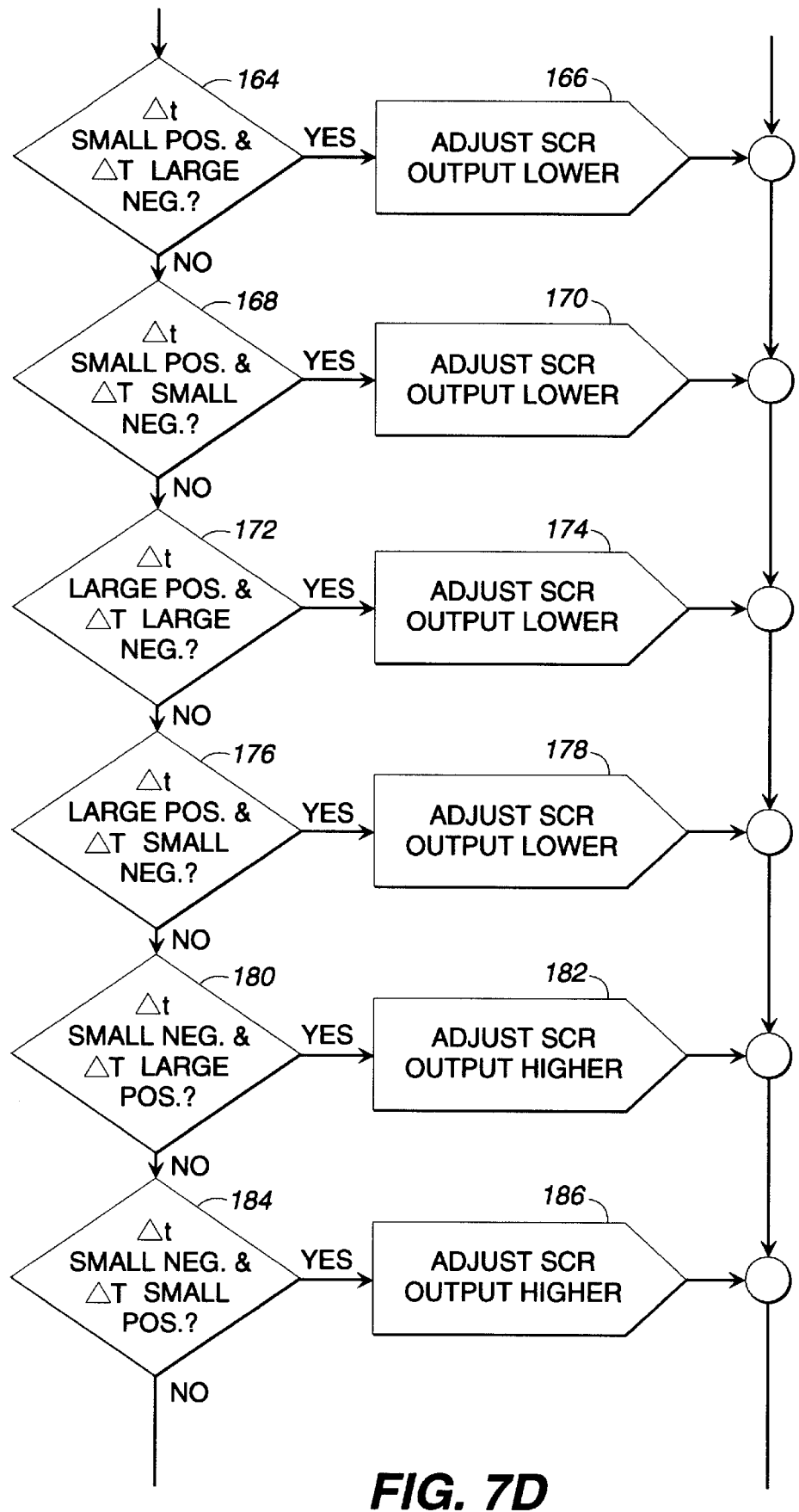
Figure 7E:
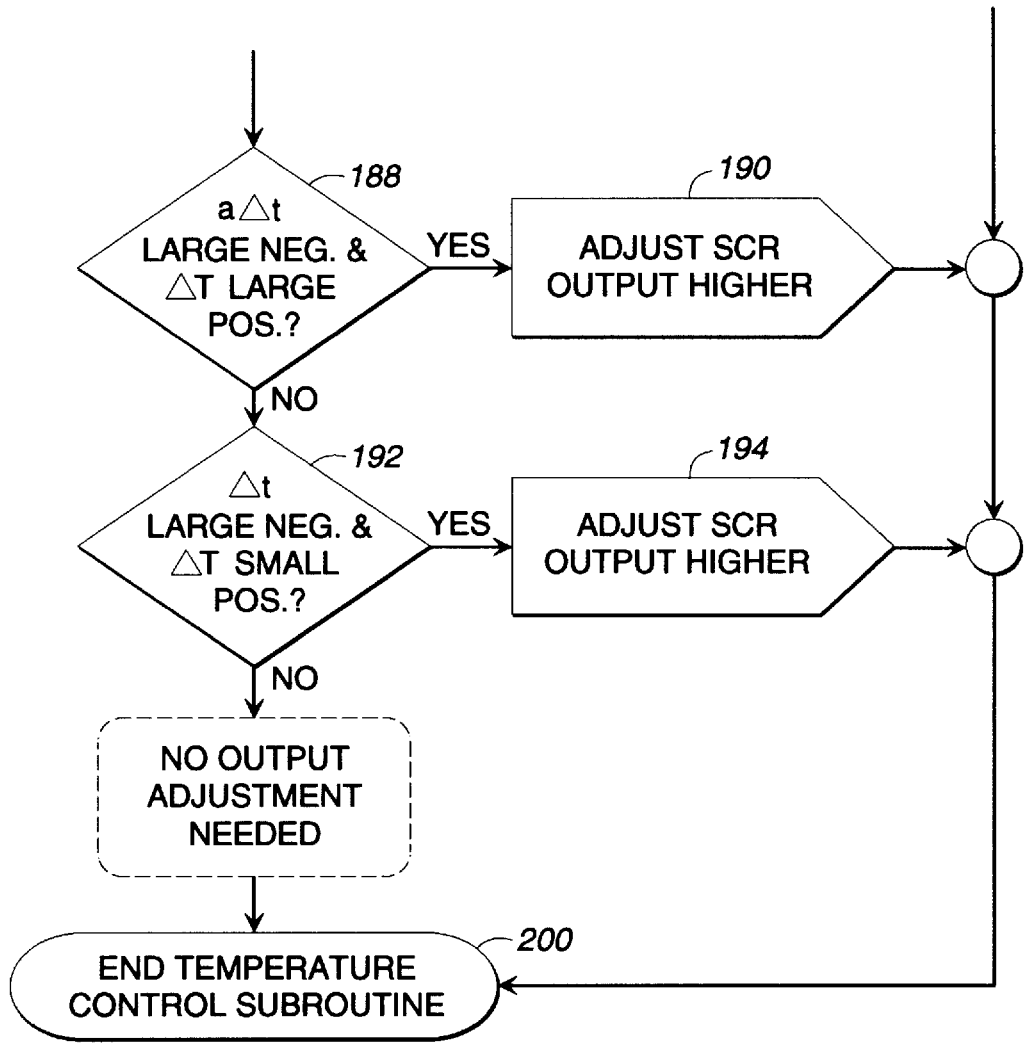

Thereafter, the program executes step 108, in which it polls whether a PLS flag is detected, signaling the presence of a sealing and crimping head being controlled. If no PLS flag is detected, the program loops back on itself to step 108 until it detects a PLS flag. Thereafter, once the PLS flag is detected, the temperature control sub-routine, step 110, illustrated in FIGS. 7C–7E, is executed by computer 29. This control sub-routine is discussed in greater detail below.

Once the temperature control sub-routine has been completed, the program moves to step 112 in which the temperature value of the crimper heads is stored in the array created in step 104. Once step 112 of the program is performed, the program proceeds to step 114 which determines whether the last sealing and crimping head has been detected, thus signaling a complete measurement of the sealing and crimping head assembly temperatures. If the last sealing and crimping head has not been detected, the program will loop back on itself to step 108 whereupon it will poll whether a PLS flag has been detected, and then execute steps 110–114 as described above. If, however, the last sealing and crimping head has been detected, the program will proceed from step 114 to 116, at which time the largest temperature value measured by the infrared temperature sensors will be called from the storage array, that value being used in step 118 to determine if the maximum temperature value is outside a deadband control limit or an otherwise predetermined control limit. If the deadband is exceeded, the program executes step 120 where an emergency stop of the sealing and crimping heads occurs due to a runaway heater, in which the heaters will ultimately melt and or burn the plastic film 15 in which the articles of product 13 are sealed. If this is the case, the program will execute step 122, at which time an abnormal stop will be signaled, and an alarm (not illustrated) will also be signaled to alert the machine operator of this fact.

If, however, the temperature value polled in step 116 is not outside the deadband/predetermined control limit, the program will proceed to step 124 in which the lowest measured temperature value of the sealing and crimping heads will be called from the storage array. The program then executes step 126 in which it is determined whether the smallest temperature value is below the deadband range, and if so, the program will execute step 128, an emergency stop for a faulty heater as the heater is not generating enough heat to properly seal the product 13 within the tube of packaging film 15. In this instance, as with step 120, step 122 of the program is executed in which an abnormal stop of the machine is signaled and a visual or audible alarm (not illustrated) is signaled by computer 29 to the operator of packaging machine 5. If it is determined in step 126 that the lowest sealing and crimping head temperature is within the deadband, the program then proceeds to step 130, in which the storage array of sealing and crimping head temperature values is shifted by taking the oldest row and discarding it, shifting the remaining values upward within the array, and adding a new value or row of values, the program looping back to step 108 to determine whether a PLS flag has been detected thus signaling whether the temperature control sub-routine illustrated in FIGS. 7C–7E should again be executed.

As discussed above, in step 110 of the control program, the temperature control sub-routine is executed as a part of the sealing and crimping head temperature sensing routine. Thus, and as illustrated in step 140 of FIG. 7C, once the temperature control subroutine has begun, the program proceeds to step 142 in which it obtains the infrared temperature sensor reading for the sealing and crimping head being measured. This control program, as well as the temperature routine, can be performed separately for each of the sealing and crimping head assemblies or for both of the sealing and crimping head assemblies together. It is anticipated that for the greatest accuracy in temperature measurement and control, the temperature control program and temperature control routine will be separately performed for each one of the sealing and crimping head assemblies, and for each head within each assembly. This also envisions that the electrical heating elements 33 and 37 of upper sealing and crimping heads 32 and lower sealing and crimping heads 36, respectively, will be controlled independently as shown in FIG. 6A.

Returning to FIG. 7C, once the infrared temperature reading is obtained, the value of $\Delta T$ is calculated in step 144. $\Delta T$ represents the difference between the target temperature, i.e., the temperature setpoint, and the temperature reading obtained by the infrared temperature sensor. Once $\Delta T$ is calculated, the program proceeds to step 146 in which the value of $\Delta t$ is calculated. $\Delta t$ represents the rate of change in the target temperature. Thereafter, the change in target temperature, $\Delta T$, and the rate of change in the change of the target temperature, $\Delta t$, will determine the output settings of the silicon controlled rectifiers 94. $\Delta T$ can thus be likened to the temperature "velocity" and $\Delta t$ can thus be likened to the temperature "acceleration". For example, a large positive $\Delta T$ with a corresponding small $\Delta t$ will mean that the heater is cool but heating up. As the temperature accelerates towards the target temperature setpoint, the silicon controlled rectifier output decreases to prevent the electrical heating element from overshooting the target temperature. Eventually the silicon controlled rectifier output stabilizes at a value that allows the heating element to maintain a relatively constant temperature at or near the target temperature.

A combination of convective, radiation, and conductive heat losses all act to remove heat from the electrical heating elements, and thus lower the temperature of the sealing and crimping heads. Convective heat loss occurs by spinning of the sealing and crimping heads through the air on shafts 31 and 35. Conductive heat loss occurs through the transfer of heat directly into the packaging film 15 being sealed by the sealing and crimping heads, as well as into the slide frames supporting the sealing and crimping head assemblies. Thus, the reason for powering each of the heating elements 33 and 37 constantly becomes apparent as there are always heat losses within the sealing and crimping heads. When packaging machine 5 stops operation, a significant heat loss goes away, namely the conductive heat transfer into the packaging film 15. This temperature control routine, however, compensates for this by detecting an initial increase in temperature, a negative $\Delta T$, and then decreasing the silicon controlled rectifier output setting until a stabilized output level is reached.

As discussed above, a programmable limit switch, in fact a group of programmable limit switches, one for each sealing and crimping head, is provided as a part of the control software program stored in computer 29. The addition of this group of programmable limit switches (PLS) allows for individual sealing and crimping head heater inspection. Each time a sealing and crimping head heating element PLS fires, the temperature is stored in an array, represented by step 108 in the temperature sensing routine.

In the event the packaging machine is stopped, so that upper sealing and crimping head assemblies 22 and 23 are not rotating, the infrared temperature sensors are limited to sensing the temperature of a single sealing and crimping head. The control program will still maintain the sealing and crimping head temperatures, but has to do so without obtaining the temperature of each sealing and crimping head within the assemblies.

The infrared temperature sensors are programmed, through the use of the PLS, to measure the hottest portion of the sensing arc 80 on the first end 77 (FIG. 5) of each sealing and crimping head 32 and 36, respectively. The infrared temperature sensor, however, is constantly "on" and is thus always measuring the temperature of each sensing arc as it rotates thereby. Thus, the PLS system is used to dictate when the infrared temperature sensors will be "fired" to obtain a temperature value. Thus, the "home" position of the sealing and crimping heads is that position in which the infrared temperature sensor measures the hottest portion of sensing arc 80 fastened to first end 77 of each sealing and crimping head (FIG. 5). Only during an emergency stop, illustrated as step 122 in FIG. 7B, will the infrared temperature sensors sense something less than the home or optimal target location on the sensing arc, which is acceptable due to the fact that the temperature of all similar sensing arc positions would be proportional to each other. The measurement of something other than the optimal temperature of sensing arc 80 will be tolerated in that the sealing and crimping head heating elements will be able to rapidly adjust to the appropriate temperature, due to the control methodology practiced by this invention in conjunction with the silicon controlled rectifier 94 used to control the adjusted high voltage output to each one of heating elements 33 and 37. However, with the precise control obtained by this apparatus, wherein the temperature deadband is controlled to generally fall within range of +/−2° from the temperature setpoint, the degree of precision available with this device is far greater than that previously available in the art.

Returning now to FIG. 7C, once step 146, the determination of $\Delta t$, has been accomplished, the program proceeds to step 148, and thereafter executes steps 148–194 in the order illustrated in FIGS. 7C–7E. Each of steps 148–194 is performed, as appropriate, for each one of the sealing and crimping heads of which the temperature is being measured by infrared temperature sensors 59 and/or 63. Thus, and for example, in step 148 if there is a small positive $\Delta t$, and a large positive $\Delta T$, the program proceeds to step 150 where silicon controlled rectifier 94 adjusts the high voltage output of the heating element so that the temperature of the heating element is increased. Thereafter, the program would loop to step 200, where the temperature control subroutine for that head is completed, whereupon the program proceeds from step 110 (FIG. 7A) to step 112 of the temperature sensing routine, in which the value determined by the temperature control subroutine is stored in the storage array of temperature values.

If, in step 148, it is determined that a small positive Δt, and a large positive ΔT does not exist, the program proceeds to step 152, where it determines whether a large positive Δt and a small positive ΔT exists. If so, the program executes step 154, in which silicon controlled rectifier 94 lowers the output of the heating element, the program then looping to step 200 completing the temperature control sub-routine, and returning to step 110 (FIG. 7A). In like fashion then, and as illustrated in FIGS. 7C–7E, a total of 12 possible combinations of large positive, small positive, large negative, small negative Δt, with a combination of large positive, small positive, large negative, or small negative ΔT is determined, in which the output of the silicon controlled rectifier is adjusted higher or lower as the case may be. However, and as illustrated in step 192, if after going through the various combinations of ΔT and Δt, it is determined that no output adjustment is needed, the silicon controlled rectifier is not controlled to raise or lower the temperature of the heating element of the sealing and crimping head being measured, and the temperature control subroutine then concludes by returning at step 200 to step 110 of the control program illustrated in FIG. 7A.

Computer 29 processes the information obtained by temperature measurement and control apparatus 7 by performing the temperature sensing routine and temperature control subroutine illustrated in FIGS. 7A–7B, and 7C–7E, respectively, by either intermittently, or constantly, determining an average temperature, obtained from the temperature storage array (step 112, FIG. 7A) for each individual sealing and crimping head. Moreover, due to the use of programmable limit switches within the temperature sensing routine, FIGS. 7A and 7B, infrared temperature sensors 59 and 63 can either constantly or intermittently report the temperature of each sensing arc 80 as it rotates past its respective infrared temperature sensor fixed in position on packaging machine 5.

As discussed above, infrared temperature sensors 59 and 63 are constantly sensing the temperature from the sensing arcs, however the PLS controls whether the data sensed by the infrared temperature sensors is constantly polled or intermittently polled. It is anticipated that the PLS will intermittently poll the data from the infrared temperature sensors, so that only the temperature from the "target" or the home location of the sensing arc will be measured, rather than the temperature of a cooler portion of the sensing arc. It is anticipated that with the conventional infrared temperature sensors currently available, that the PLS will poll the infrared temperature sensor(s) every 100 milliseconds to obtain a temperature measurement of the sensing arc.

Figure 9:
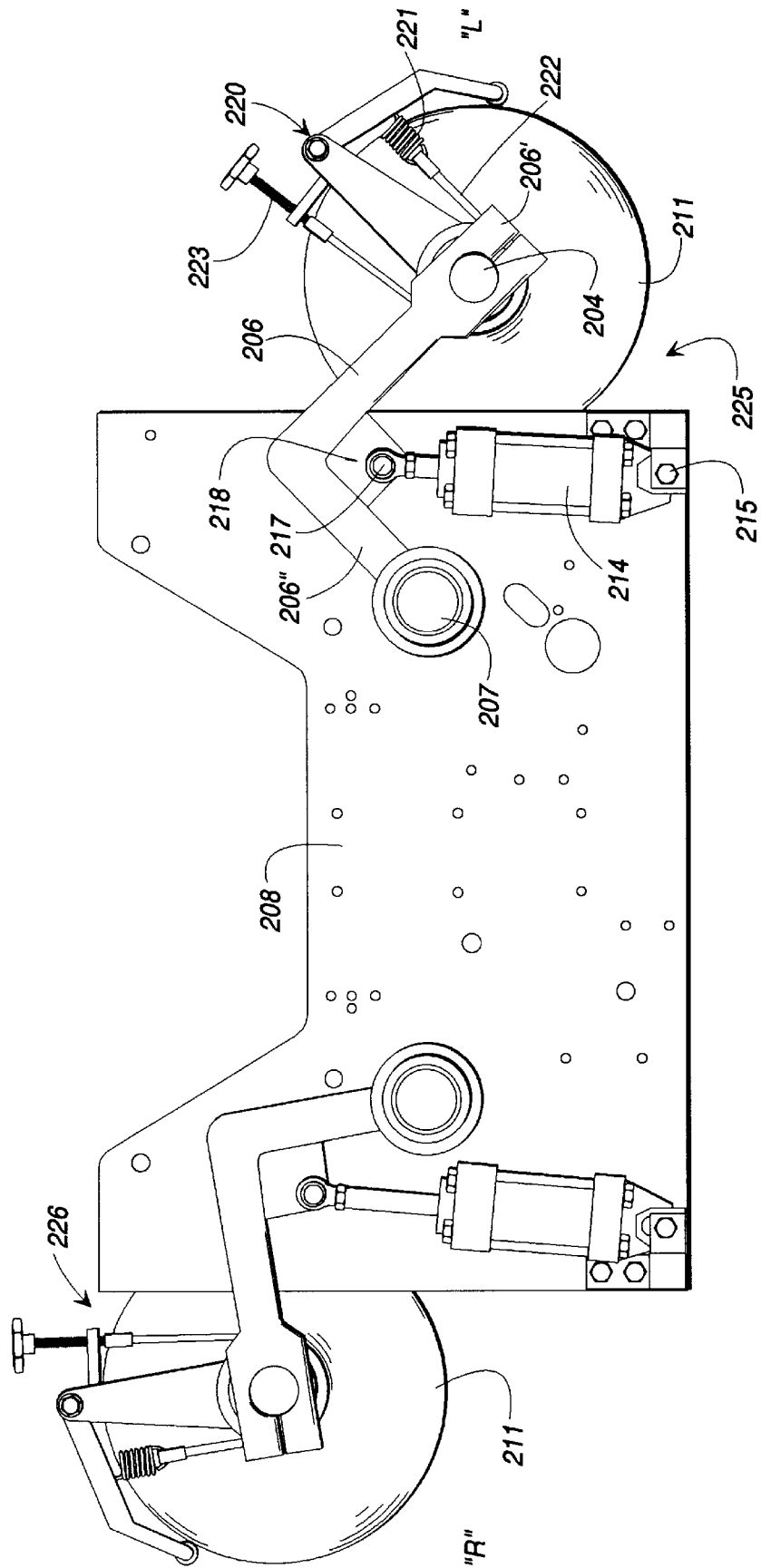
FIG. 9 is a side elevational view of the packaging film loading apparatus illustrated in FIG. 1.
Figure 10:
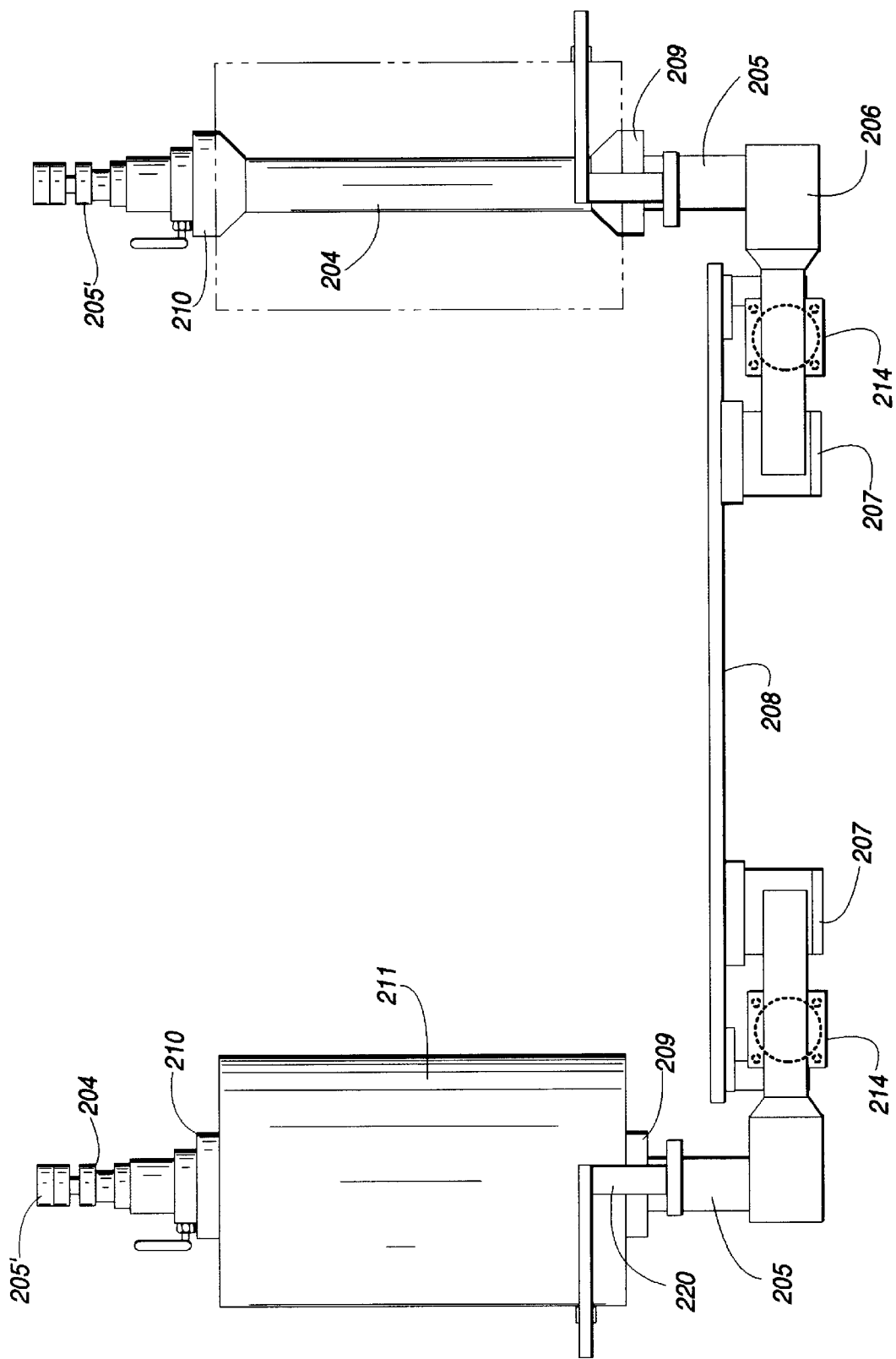
FIG. 10 is a top elevational view of the apparatus illustrated in FIG. 9.

FIGS. 9–10 illustrate the packaging film loadings apparatus 9 of FIG. 1 in greater detail.

Due to the construction of packaging machine 5, in which a plurality of idler rollers 16 and a powered feed roller 17 are provided for pulling the packaging film 15 through the machine and toward forming shoe 19, all as shown generally in FIG. 1, the packaging machines of the art position the roll or rolls of packaging film 15 in a fixed and elevated position with respect to infeed conveyor 11 and the articles of product 13 conveyed thereon toward forming shoe 19. When a roll of packaging film is placed on the machine, it thus must be raised in position, requiring people of smaller stature to lift and hold the roll of film in a position at or above head level while attempting to place the roll of film onto film spool 204 (FIG. 9) prior to threading the film into the machine over the idler rollers 16 and power feed roller 17. Although this may not seem to be a problem, rolls of packaging film 15 often weigh up to 70 pounds, and for people of smaller stature it is extremely difficult, if not impossible, to lift and load the rolls of packaging film while holding the roll of film over their head and leaning over infeed conveyor 11 to position the roll of packaging film on film spool 204.

Figure 11:
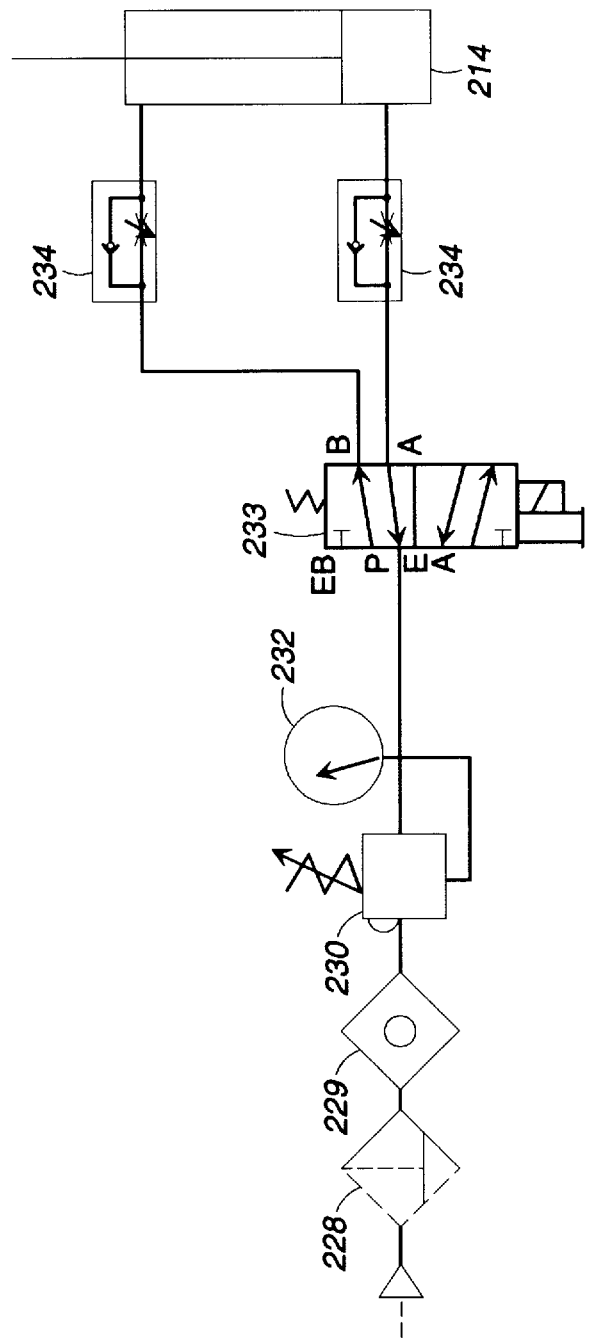
FIG. 11 is a schematic illustration of the packaging film loading apparatus control components.

Packaging film loading apparatus 9 is illustrated in greater detail in FIGS. 9–11. Turning first to FIG. 9, packaging film loading apparatus 9 includes a film spool 204 having a first end 205 and a spaced second end 205' (FIG. 10). First end 205 of film spool 204 is fastened to film spool support arm 206. Film spool 204 is rigidly held by the first end 206' of film spool support arm 206. Second end 206" of film spool support arm 206 includes a bearing assembly 207, bearing assembly 207 being mounted on frame backplate 208. As such, bearing assembly 207 forms a pivotal connection point between support arm 206 and backplate 208.

Referring to FIG. 10, film spool 204 includes a hub assembly 209 and an opposed self centering chuck 210, both of which are adapted to be received within the hollow tube core (not illustrated) of a roll of packaging film 211 positioned on film spool 204. Hub 209 and chuck 210 act to secure and center the roll of packaging on film spool 204 with respect to the packaging machine, so the film can be threaded into the machine and passed toward the film forming shoe to form the continuous and elongated tube of packaging film which enclose the articles of spaced product 13. Both hub 209 and chuck 210 have internal bearing assemblies so that the hub and chuck rotatably support roll of packaging film 211 on spool 204.

Double action cylinder 214 is shown in FIG. 9, and is provided as a part of packaging film loading apparatus 9. As shown in FIG. 9, cylinder 214 has a first end 214', and a spaced second end 214". Cylinder 214 includes, in known fashion, an elongate cylinder rod 216 mounted to a cylinder piston (not illustrated) and having a free end 216' extending out of the second end of the cylinder. Cylinder 214 has a bottom pivot connection 215 at the first end of the cylinder which is fastened to frame backplate 208, and a top pivot connection 217 at the free end of cylinder rod 216 which is fastened to a gusset plate 218 formed as a part of film spool support arm 206. As shown in FIG. 9, therefore, cylinder 214 can move film spool 204 into a generally lowered loading position 225, as illustrated by the notation "L" in FIG. 9, and into a generally raised working position 226 as illustrated by the notation "R" in FIG. 9. It is anticipated that in its lowered working position film spool 204 will be at roughly mid-torso height with respect to the body of the machine operator who will be loading the roll of packaging film 211 onto film spool 204.

Film is loaded on spool 204 in the following fashion. The roll of packaging film 15 is lifted in position and placed onto film spool 204, film spool 204 passing through the hollow tube core of the roll of packaging film. The roll of packaging film is passed over the film spool until the rear portion of the hollow core is received on hub 209. Next, self centering chuck 210 is placed on film spool 205, and passed toward and into contact with the open end of the packaging film tube core. The shape and configuration of hub 209 and chuck 210 help to ensure that the roll of packaging film is centered on both the hub and the chuck with respect to the longitudinal axis of film spool 204 to prevent any unwanted wobble or vibration as the packaging film is pulled off the roll of film and through the machine. The chuck is locked in position against the roll of film, and a single solenoid, spring return valve 233 (FIG. 11) is actuated to extend cylinder 214 from its retracted position to its raised working position. Thereafter, the free end of the packaging film web is placed over idler rollers 16 and power feed roller 17, and extended toward forming shoe 19.

Cylinder 214 is a double action pneumatic cylinder, although a hydraulically actuated cylinder could work just as well, as well as an electrically powered actuator, for example, a servo motor. Cylinder 214 being an air cylinder, therefore, the control system for apparatus 9 is illustrated in FIG. 11, and includes an air particulate filter 228, a coalescing filter 229, and an air pressure regulator 230. Air pressure regulator 230 has an air pressure gauge 232 for measuring the line pressure. Once the air pressure line leaves regulator 230, it extends into a single solenoid, spring return, five port, two position actuating valve 233. Thereafter, the air line is split and passes into two flow control valves 234 arranged parallel to one another, and from there to double action pneumatic cylinder 214. All of the components used in the control system for packaging film loading apparatus 9 are otherwise conventional.

In operation, single solenoid spring return valve 233 is actuated to either raise or lower film spool 205 along with film spool support arm 206. Thus constructed, packaging film loading apparatus 9 provides a simple yet efficient, and economical means for loading packaging film onto a horizontal food packaging machine.

While a preferred embodiment of the invention has been disclosed in the foregoing specification, it is understood by those skilled in the art that variations and modifications thereof can be made without departing from the spirit and scope of the invention, as set forth in the following claims. In addition, the corresponding structures, materials, acts, and equivalents of all means or step plus function elements in the claims below are intended to include any structure, material, or acts for performing the functions in combination with other claimed elements as specifically claimed.

We claim:

1. A method of loading a roll of flexible packaging film on a packaging machine, the packaging machine having an elongate film spool, and a packaging film forming shoe, the packaging film having a web, the web having a free end, said method comprising the steps of:

passing the roll of packaging film over at least a portion of the film spool;

rotatably mounting the roll of packaging film on the film spool;

moving a film spool support arm, to which the film spool is fastened, from a lowered loading position with respect to the packaging film forming shoe into a raised working position.

2. The method of claim 1, including the step of loading the packaging film into the packaging film forming shoe.

3. The method of claim 2, wherein the step of loading the roll of packaging film into the packaging film forming shoe includes the step of passing the free end of the packaging film web over at least one idler roller, over at least one feed roller, and into the packaging film forming shoe of the packaging machine.

4. The method of claim 1, including the step of reciprocably moving said film spool support arm from said lowered loading position into said raised working position and back.

5. The method of claim 1, the step of rotatably mounting the roll of packaging film on the film spool including the step of simultaneously centering the roll of packaging film about the film spool.

6. An apparatus for loading a roll of flexible packaging film on a horizontal packaging machine, the packaging machine having a packaging film forming shoe, the packaging film having a web, the web having a free end, the packaging film web being wound about a packaging film tube core to form the roll of packaging film, said apparatus comprising:

an elongate film spool;

a film spool support arm having a first end and a spaced second end, the first end of said support arm being pivotally supported on the packaging machine, the second end of said arm having said film spool fastened thereto; and means for reciprocably moving said support arm into a lowered loading position with respect to the packaging film forming shoe into a raised working position and back.

7. The apparatus of claim 6, further comprising means for securing the roll of packaging film on said spool.

8. The apparatus of claim 6, wherein said means for reciprocably moving said arm comprises a double action cylinder having a first end and a second end, and an elongate displaceable cylinder rod mounted within said cylinder, said cylinder rod extending out of the second end of said cylinder, the first end of said cylinder being pivotally supported on the packaging machine and a free end of said cylinder rod being pivotally fastened to said arm, and a means for actuating said cylinder.

9. The apparatus of claim 8, wherein said cylinder comprises a pneumatic cylinder.

10. The apparatus of claim 8, wherein said means for actuating said cylinder comprises at least one single solenoid spring return valve.

11. The apparatus of claim 8, wherein said cylinder comprises a hydraulic cylinder.

12. The apparatus of claim 8, wherein said cylinder comprises a linear actuator.

13. The apparatus of claim 6, said means for securing the roll of packaging film on said spool being constructed and arranged to rotatably support the roll of packaging film on the film spool.

14. The apparatus of claim 13, said means for securing the roll of packaging film on said spool comprising;

a pair of spaced and opposed mounting chucks fastened to the film spool, said chucks being constructed and arranged to lock the roll of packaging film therebetween;

wherein each said chuck has a frustoconical surface facing toward the frustoconical surface of the opposed mounting chuck for receiving the roll of packaging film thereon;

each of said frustoconical surfaces being constructed and arranged to center the roll of packaging film about the film spool and each said frustoconical surface being further constructed and arranged for being rotated about said film spool to allow the roll of packaging film to be rotated about the film spool.

15. The apparatus of claim 6, said means for securing the roll of packaging film on said spool being constructed and arranged to simultaneously center the roll of packaging film about said film spool while securing the roll of packaging film to the film spool.

16. In a packaging machine having a framework, an endless conveyor supported on the framework and carrying a spaced series of articles for being packaged within a packaging film toward a packaging film forming shoe used to wrap the packaging film about the articles, a packaging film transport assembly including at least one packaging film idler roller and at least one packaging film feed roller supported on the framework with respect to the packaging film forming shoe, and at least one roll of packaging machine film, the improvement comprising:

a first packaging film loading apparatus supported on the framework of the packaging machine with respect to the packaging film transport assembly, said first film loading apparatus comprising:

an elongate packaging film spool constructed and arranged to rotatably support a roll of the packaging film thereon;

an elongate packaging film spool support arm having a first end and a spaced second end, said packaging film spool being fastened to said first end and extending away therefrom, wherein said second end of said support arm is pivotally supported on the framework of the packaging machine; and means, pivotally supported on the framework of the packaging machine with respect to said support arm and being operably engaged with said support arm, for moving said support arm from a raised working position with respect to the packaging film transport assembly into a lowered loading position and back;

whereby the packaging film spool support arm is lowered by the means for moving the support arm into the lowered loading position from the raised working position so that the roll of packaging film may be conveniently placed onto the packaging film spool, whereupon the support arm is raised back into its working position so that the packaging film can be fed through the packaging film transport assembly and into the packaging film forming shoe.

17. The packaging machine of claim 16, further comprising a second packaging film loading apparatus supported on the frame of the packaging machine with respect to said first packaging film loading apparatus, said second packaging film loading apparatus being constructed in fashion identical to said first packaging film loading apparatus, but in opposite hand, for supporting a second roll of the packaging film thereon.

* * * * *